US012044474B1

(12) United States Patent
Troxler

(10) Patent No.: US 12,044,474 B1
(45) Date of Patent: Jul. 23, 2024

(54) MICROWAVE AND VACUUM DRYING DEVICE, SYSTEM, AND RELATED METHODS

(71) Applicant: International Research Institute Inc., Raleigh, NC (US)

(72) Inventor: Robert Ernest Troxler, Raleigh, NC (US)

(73) Assignee: International Research Institute (IRI), Raleigh, NC (US)

( * ) Notice: Subject to any disclaimer, the term of this patent is extended or adjusted under 35 U.S.C. 154(b) by 0 days.

(21) Appl. No.: 18/152,011

(22) Filed: Jan. 9, 2023

Related U.S. Application Data

(63) Continuation of application No. 17/347,092, filed on Jun. 14, 2021, now Pat. No. 11,549,750, which is a continuation of application No. 16/400,397, filed on May 1, 2019, now Pat. No. 11,035,612, which is a continuation of application No. 16/154,968, filed on Oct. 9, 2018, now Pat. No. 10,309,722, which is a continuation-in-part of application No. 14/214,630, filed on Mar. 14, 2014, now abandoned.

(60) Provisional application No. 61/785,524, filed on Mar. 14, 2013.

(51) Int. Cl.

| | |
|---|---|
| ***F26B 5/04*** | (2006.01) |
| ***F26B 3/347*** | (2006.01) |
| ***F26B 9/06*** | (2006.01) |
| ***F26B 25/22*** | (2006.01) |

(52) U.S. Cl.
CPC .............. *F26B 5/048* (2013.01); *F26B 3/347* (2013.01); *F26B 9/06* (2013.01); *F26B 9/066* (2013.01); *F26B 25/22* (2013.01)

(58) Field of Classification Search
CPC ...... F26B 5/00; F26B 7/00; F26B 9/00; F26B 5/048; F26B 3/347; F26B 9/06; F26B 9/066; F26B 25/22
USPC ........................................................... 34/263
See application file for complete search history.

(56) References Cited

U.S. PATENT DOCUMENTS

| | | | | |
|---|---|---|---|---|
| 3,839,616 A * | 10/1974 | Risman | ................ | H05B 6/6458 219/757 |
| 4,257,173 A | 3/1981 | Smith | | |
| 4,348,817 A | 9/1982 | Bradshaw | | |
| 4,615,125 A | 10/1986 | Wyborn | | |
| 5,671,546 A | 9/1997 | Haala | | |
| 5,675,909 A * | 10/1997 | Pare | ..................... | B01D 1/0017 34/305 |
| 5,680,712 A | 10/1997 | Kiyokawa et al. | | |
| 5,732,476 A | 3/1998 | Pare | | |
| 5,884,417 A | 3/1999 | Pare | | |
| 6,865,821 B2 | 3/2005 | Merschat | | |

(Continued)

FOREIGN PATENT DOCUMENTS

DE 2307255 A * 9/1973 ........... H05B 6/6458

*Primary Examiner* — Stephen M Gravini
(74) *Attorney, Agent, or Firm* — NK Patent Law PLLC

(57) ABSTRACT

A method for drying at least one sample of material is provided. The method includes placing the at least one sample of material into a chamber and then sealing the chamber. The method includes applying a vacuum to the chamber in order to reduce the pressure therein. The method includes heating the at least one sample using electromagnetic energy while applying the vacuum to the chamber. The method includes measuring at least one condition of the chamber and determining that the sample is dry based on the at least one monitored condition.

20 Claims, 14 Drawing Sheets

(56) References Cited

U.S. PATENT DOCUMENTS

| | | | | |
|---|---|---|---|---|
| 7,194,821 | B2 | 3/2007 | Edamura et al. | |
| 7,334,346 | B2 | 2/2008 | Nomine | |
| 7,367,139 | B2 | 5/2008 | Ando et al. | |
| 7,383,643 | B2 | 6/2008 | Blankenship et al. | |
| 7,665,226 | B2 | 2/2010 | Tsuruta et al. | |
| 8,196,312 | B2 | 6/2012 | Taguchi | |
| 8,205,353 | B2 | 6/2012 | Ramhold et al. | |
| 10,309,722 | B1 | 6/2019 | Troxler | |
| 11,035,612 | B1 * | 6/2021 | Troxler | F26B 9/06 |
| 11,549,750 | B1 * | 1/2023 | Troxler | F26B 9/06 |
| 2010/0282272 | A1 | 11/2010 | Godot et al. | |
| 2012/0171462 | A1 | 7/2012 | Tsai | |
| 2014/0283408 | A1 | 9/2014 | Chun et al. | |
| 2020/0158430 | A1 | 5/2020 | Guan | |

* cited by examiner

MICROWAVE AND VACUUM DRYING DEVICE, SYSTEM, AND RELATED METHODS

CROSS-REFERENCE TO RELATED APPLICATIONS

This application is a continuation of U.S. patent application Ser. No. 17/347,092, filed on Jun. 14, 2021, which is a continuation of U.S. patent application Ser. No. 16/400,397, filed on May 1, 2019, issued as U.S. Pat. No. 11,035,612 on Jun. 15, 2021, which is a continuation of U.S. Patent application Ser. No. 16/154,968, filed on Oct. 9, 2018, issued as U.S. patent Ser. No. 16/154,968 on Jun. 4, 2019, which claims priority to U.S. patent application Ser. No. 14/214,630 filed on Mar. 14, 2014, which claims priority to U.S. Provisional Patent Application No. 61/785,524, filed on Mar. 14, 2013, the entire contents of which are incorporated by reference herein.

TECHNICAL FIELD

This disclosure is directed towards a microwave and vacuum drying device, system, and related methods.

BACKGROUND

Asphalt cores are removed from a road surface for subsequent testing in order to determine the structural characteristics of the road surface. One such characteristic is the density of the road surface. This is particularly important because of the granular and aggregate makeup of paving materials, which can have voids and other gaps that impact the structural integrity of the road surface.

Due to the interconnected voids and gaps found in an asphalt core, and the moisture content trapped within the voids due to the environment or core extraction process, it is important to remove the moisture from the asphalt core in order to determine a dry density or other mechanistic or volumetric parameter thereof. Removing the moisture content can be time consuming. One could air dry the core, but doing so would take an unacceptably long time. One could apply heat to the core, but doing so could cause unintended consequences to the core integrity. Previous attempts to dry cores involved lowering the pressure surrounding the core. This results in rapidly lowering the sample temperature through an evaporation process. Relying exclusively on heat conduction from a support or plate, or typical convection methods is not a reasonable solution; as with a vacuum process, convection does not exist. Infrared Radiation heats only the surface of the sample or core, thus further relying on the conduction of heat energy from the surface to gradually heat the center or volume of the sample. By incorporating RF, RF induction, or microwave sources, a substantial volume of the core or pavement material is instantly filled with energy, thermally inducing evaporation and drastically reducing time to remove the moisture.

A need therefore exists for a method or solution that addresses these disadvantages.

SUMMARY

This Summary is provided to introduce a selection of concepts in simplified forms that are further described below in the Detailed Description of Illustrative Embodiments. This Summary is not intended to identify key features or essential features of the claimed subject matter, nor is it intended to be used to limit the scope of the claimed subject matter.

Disclosed herein are one or more microwave and vacuum drying systems, devices, and methods for drying asphalt samples, cores, aggregates, soils and pavement materials. Obtaining the moisture content of a soil quickly in the field or laboratory is also desired.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
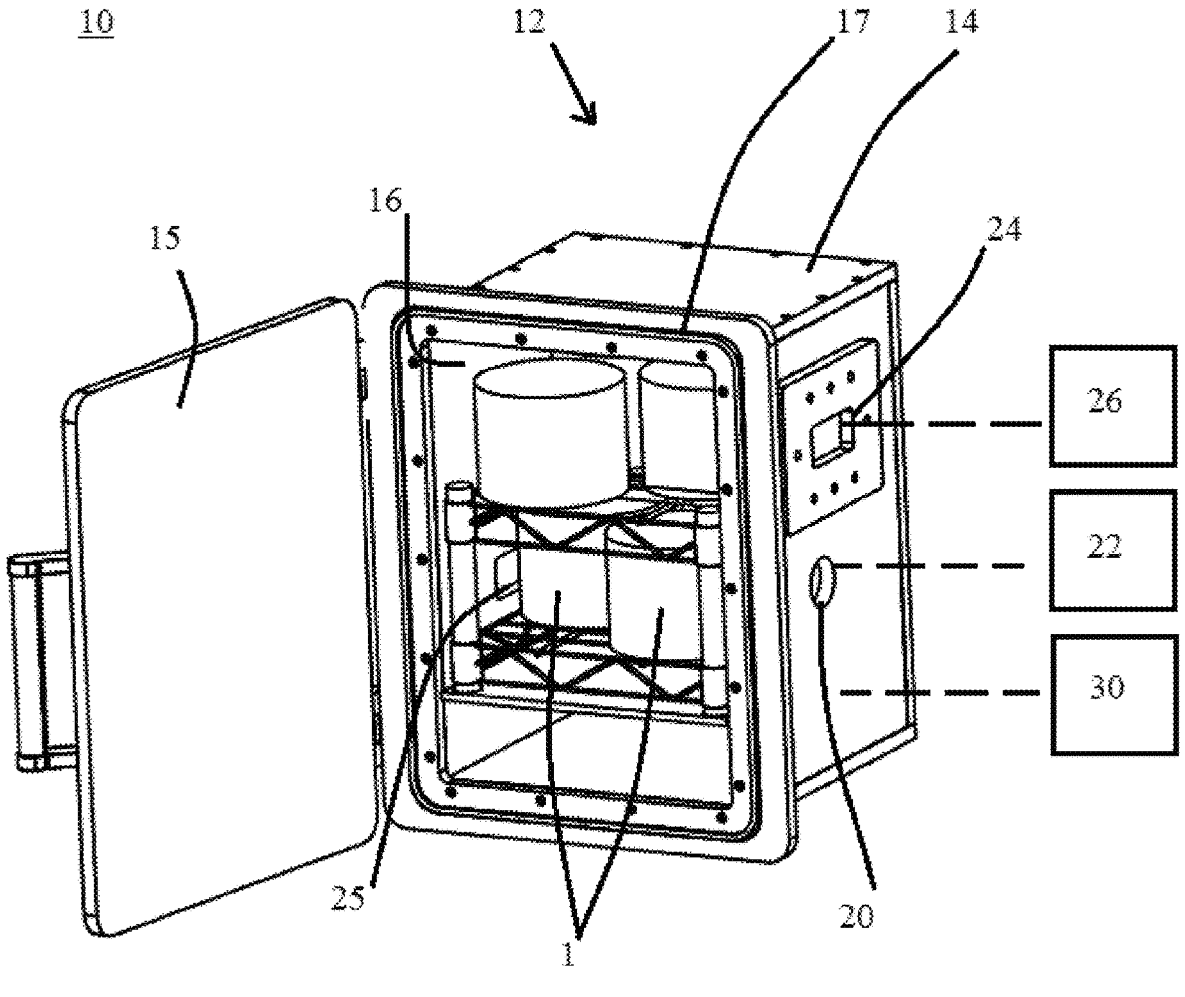
FIG. 1 is a perspective view of a sample drying system according to one or more embodiments disclosed herein.
Figure 2:
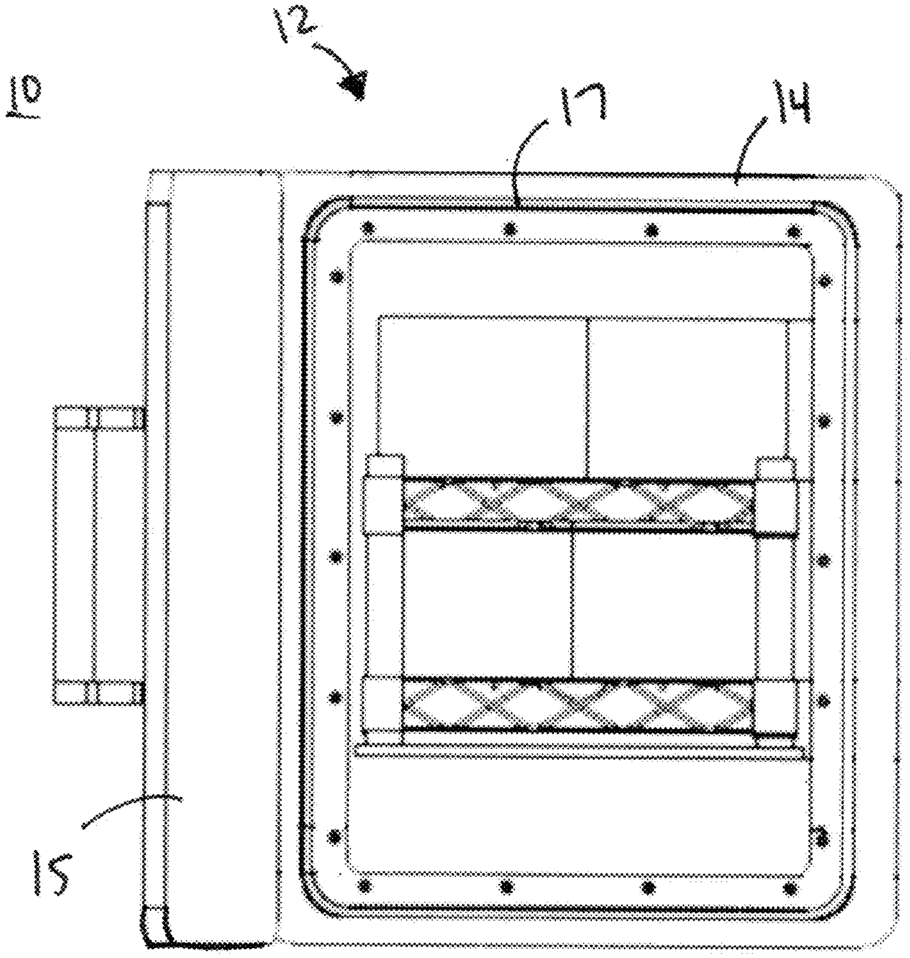
FIG. 2 is a front view of a sample drying system according to one or more embodiments disclosed herein.
Figure 3:
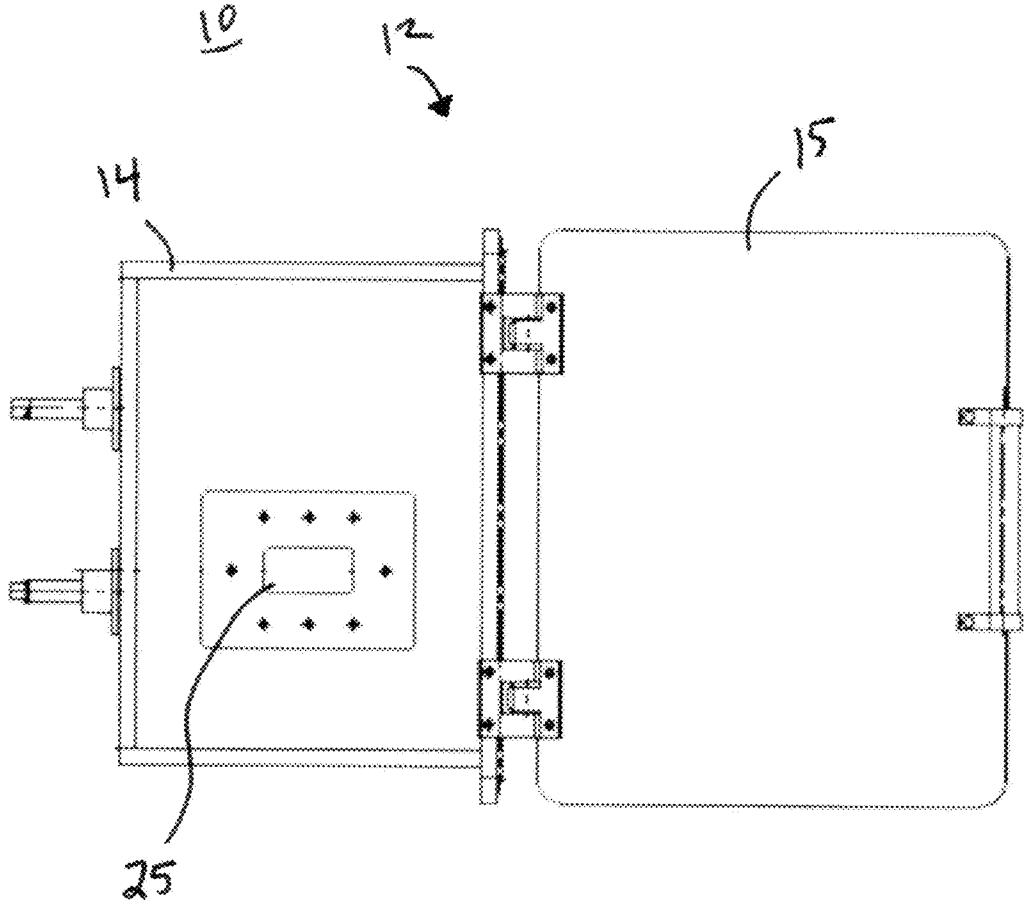
FIG. 3 is a side view of a sample drying system according to one or more embodiments disclosed herein.

One or more systems 10 are generally designated throughout the drawings, and with particular reference to FIGS. 1, 2, and 3. The system 10 is provided for drying one or more samples of pavement material removed from a road bed, base, embankment, surface or conveyor. The system 10 includes a sealable chamber 12. The sealable chamber 12 may include an enclosure 14 that defines an interior 16.

Interior 16 may include racks or other support structures that allow for placement of multiple samples of material if desired. The enclosure may include a seal 17 for sealing against a door 15 or other access feature. One or more racks may be provided for allowing placement of multiple materials to be dried with the one or more systems disclosed herein.

The enclosure 14 may define an outlet 20 that is configured for communicating to a pump 22 as will be further described herein. The enclosure 14 may additionally define an aperture 24 and an opening 25 that are configured for communicating with one or more microwave sources 26.

The pump 22 may be provided for applying vacuuming forces to the interior of chamber 12 in order to reduce the pressure therein to aid in removal of moisture within the sample of material as will be further described herein. The microwave source 26 is provided for applying heating to the samples interior of chamber 12 in order to aid in removal of moisture within the sample of material as will be further described herein.

Figure 5A:
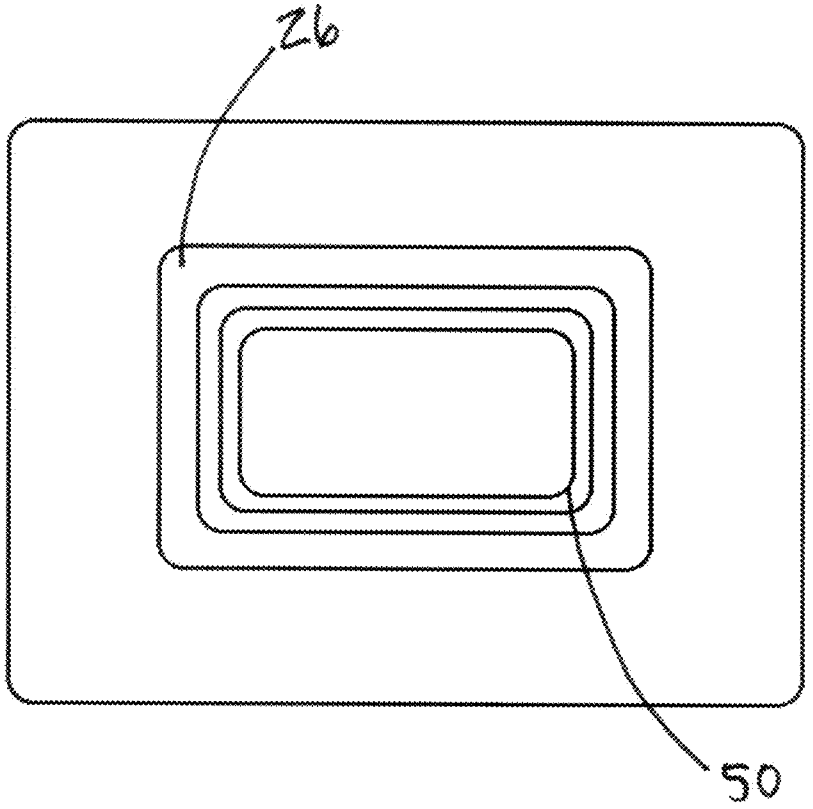
FIG. 5A illustrates a waveguide installed in proximity to the one or more drying systems according to one or more embodiments disclosed herein.
Figure 5B:
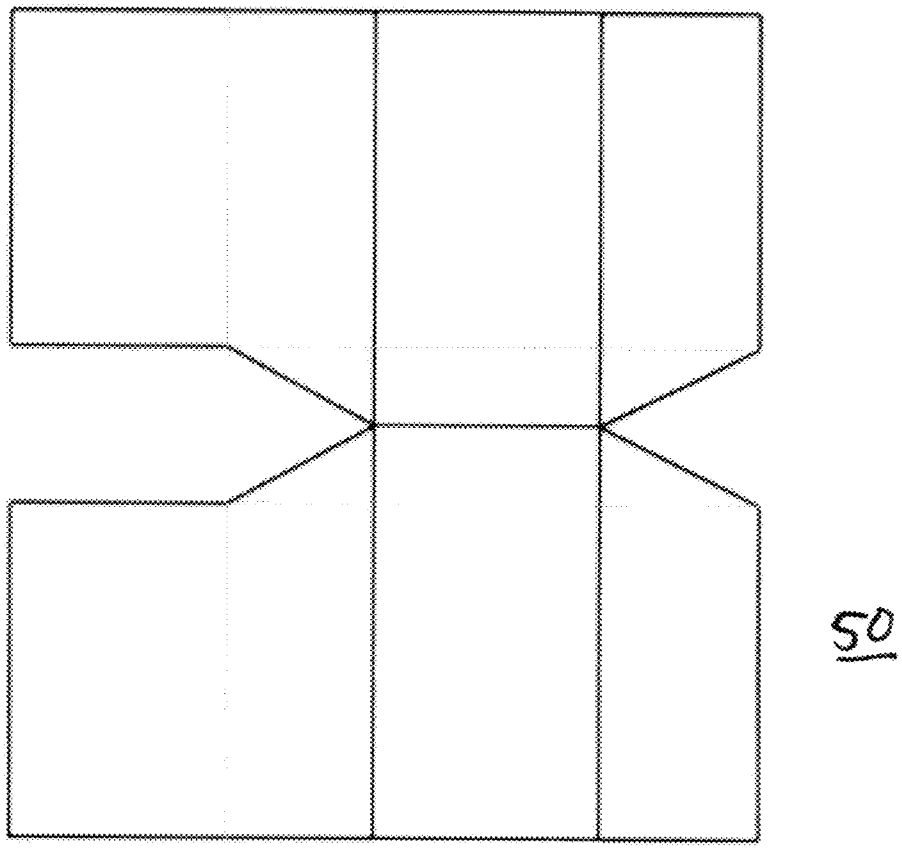
FIG. 5B illustrates an unfolded layout of the waveguide of FIG. 5A according to one or more embodiments disclosed herein.

A wave guide 50 as is further described herein may be in communication with openings 25 and 26 in order to direct microwaves into the chamber 12. The waveguide 50 is illustrated in FIG. 5A and FIG. 5B, in which the waveguide 50 is operably coupled with opening 26. The waveguide 50 illustrated includes a folded thin sheet of metal. The elbow of the wave guide will be defined in accordance to the side flange port 25, 26 of the microwave.

Figure 4:
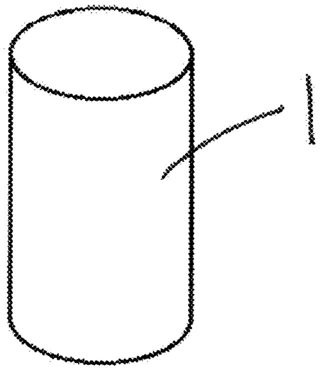
FIG. 4 is a perspective view of a sample of material to be tested with the one or more drying systems disclosed herein.

The sample may be an asphalt core 1, as illustrated in FIG. 4. Also disclosed herein, sample may be loose aggregate, soil, concrete components, and other construction related materials. A load cell may be in communication with the interior of the chamber to aid in calculating moisture content, or dryness.

Figure 6:
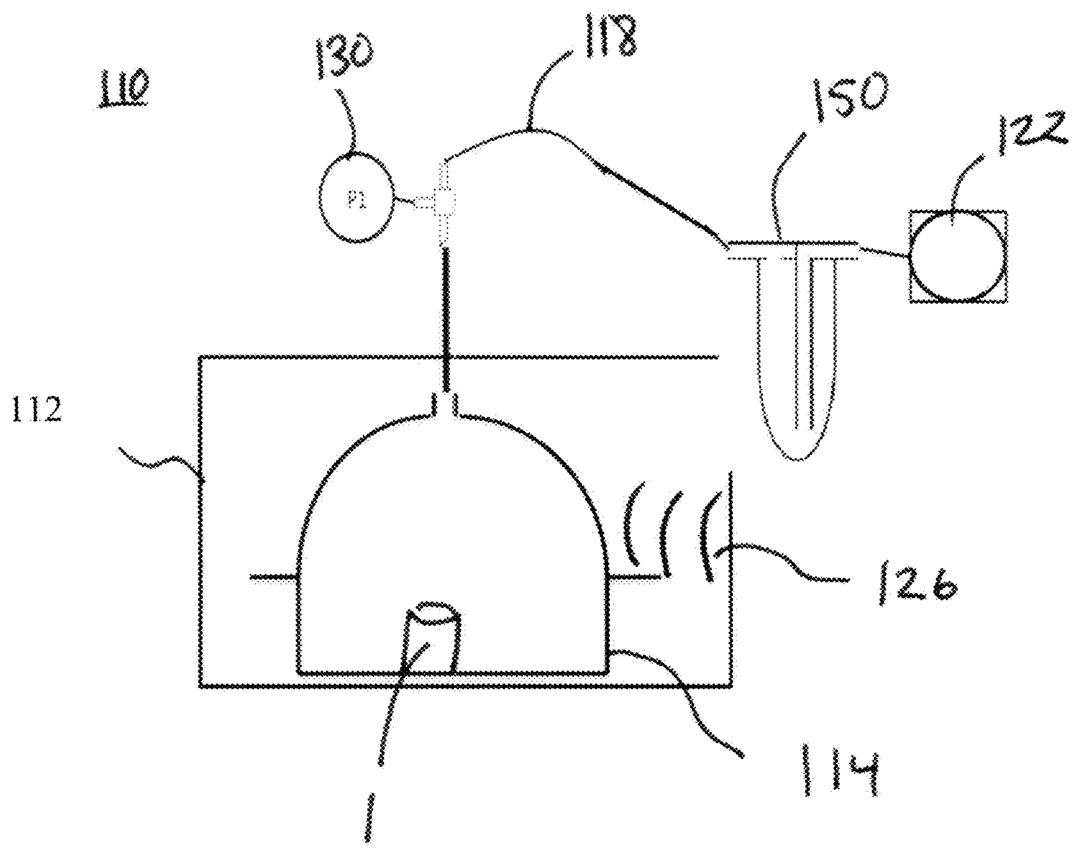
FIG. 6 is a schematic view of a sample drying system according to one or more embodiments disclosed herein.

This is vacuum chamber inside microwave cavity. One or more alternate configurations of a system are illustrated in FIG. 6. In this embodiment, system 110 was used in one or more experimental test as will be described herein. System 110 includes a container 112 to which microwave energy 126 is introduced. An enclosure 114 may be provided that is configured for being sealed and receiving a sample material 1 therein. In one or more experiments, the enclosure 114 was a vacuum pycnometer made of low loss plastic, ceramic material or pyrex, available from any suitable provider, and while commercial embodiments may not employ a pycnometer, the pycnometer was suitable for the one or more experiments herein. The pycnometer is separable about a portion thereof such that a construction material can be placed into the interior and the portions re-engaged in a sealable configuration. A pump or vacuum 122 provides pumping forces along a line 118 to the enclosure 114, thereby applying a pressure or reducing the pressure to produce vacuum therein to the sample 1. Fluid flow can go in either direction with the proper valve configuration. The line 118 may be in further communication with a water trap such as a cold trap 150 and a pressure gauge 130 that monitors the pressure in enclosure 114. Cold traps also aid the vacuum pumping process when removing air as they form cryogenic pumping forces in series or parallel to the pump 122. Water vapor and liquid is kept from going into the vacuum pump using any water removal method such as a cold trap, desiccant, centrifuge.

Figure 7:
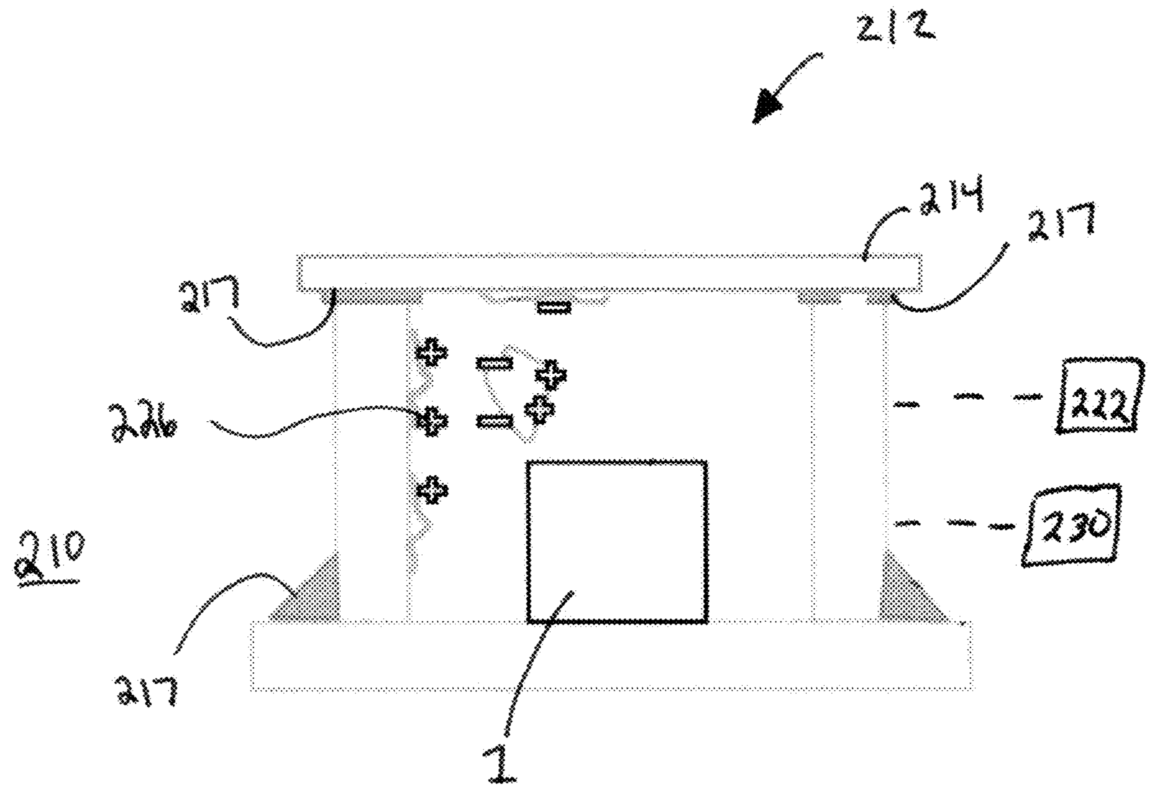
FIG. 7 is a schematic view of a sample drying system according to one or more embodiments disclosed herein.

One or more alternate configurations of a system are illustrated in FIG. 7. In this embodiment, system 210 was used in one or more experimental test as will be described herein. System 210 includes a container 212 to which microwave energy 226 is introduced. An enclosure 214 may be provided that is configured for being sealed and receiving a sample material 1 therein. A pump or vacuum 222 provides pumping forces to the enclosure 214, thereby applying a pressure to induce fluid flow therein to the sample 1. A sealing member 217 may be provided for providing a pressure tight seal of the container 212. A sealing member may be o-ring or silicon.

Figure 8:
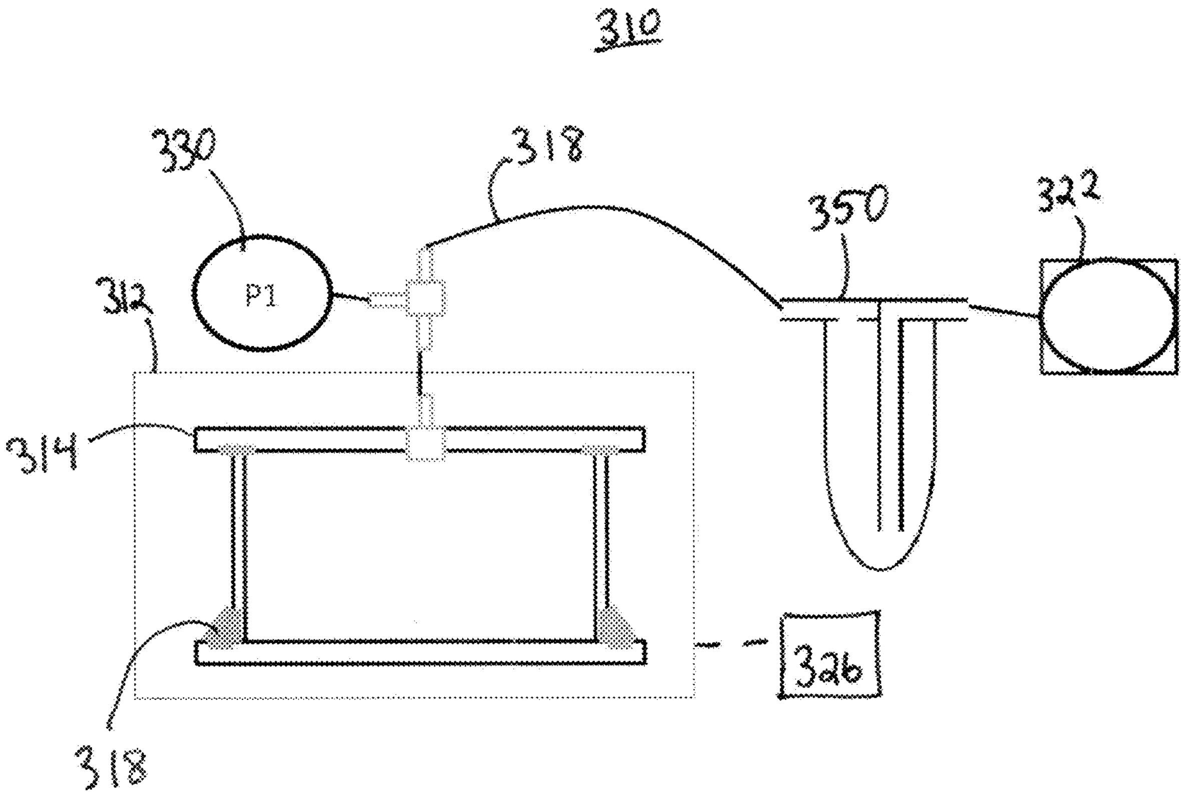
FIG. 8 is a schematic view of a sample drying system according to one or more embodiments disclosed herein.
Figure 9:
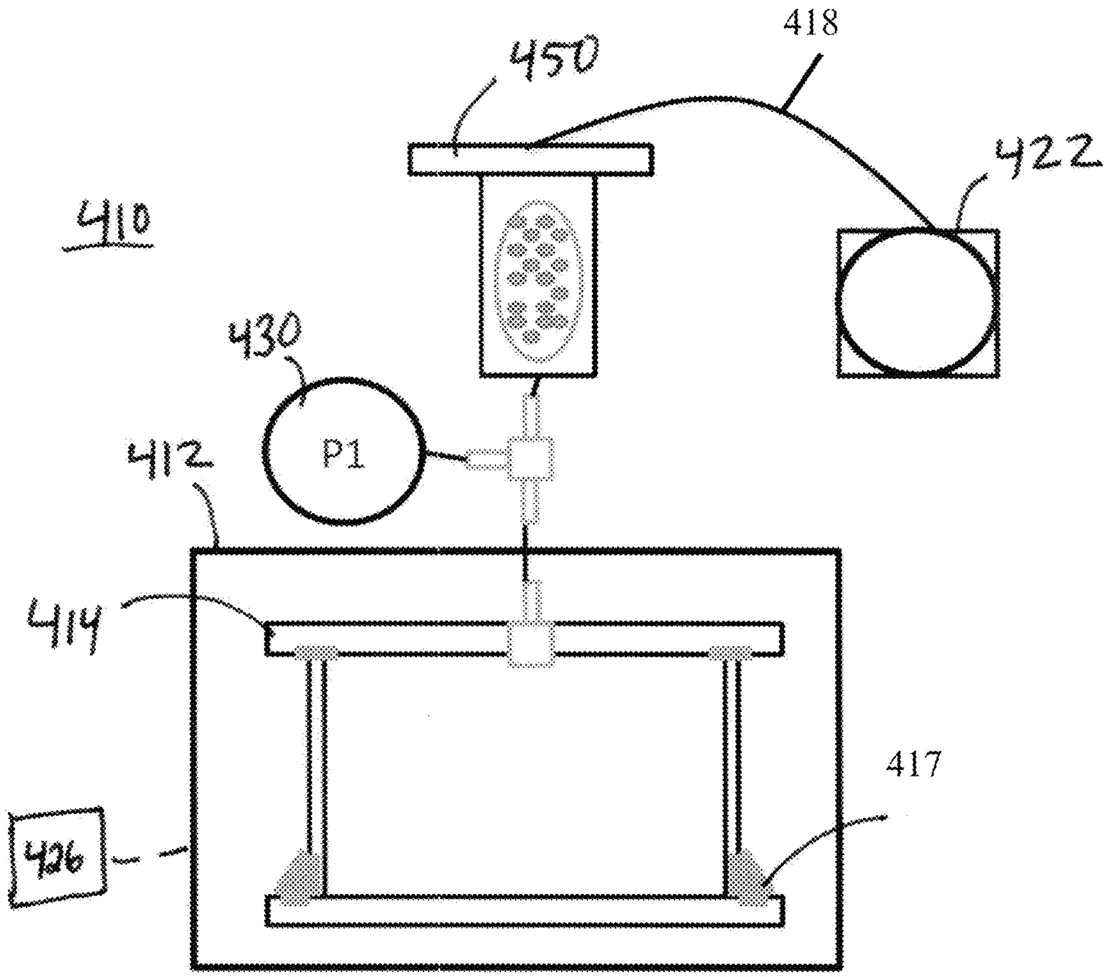
FIG. 9 is a schematic view of a sample drying system according to one or more embodiments disclosed herein.

One or more alternate configurations of a system are illustrated in FIG. 8 that combines aspects of system 110 in FIG. 6 and system 210 in FIG. 7. In this embodiment, system 310 was used in one or more experimental test as will be described herein. System 310 includes a container or cavity 312 to which microwave energy 326 is introduced. An enclosure 314, similar to enclosure 214, may be provided that is configured for being sealed and receiving a sample material 1 therein. A pump or vacuum 322 provides pumping forces to the enclosure 314, thereby applying a pressure therein to the sample 1. A sealing member 317 may be provided for providing a pressure tight seal of the container 312 different containers. The pump or vacuum 322 provides pumping forces along a line 318 to the enclosure 314, thereby applying a pressure therein to the sample 1. The line 318 may be in further communication with a cold trap 350 and a pressure gauge 330 that monitors the pressure in enclosure 314. One or more alternate configurations of a system are illustrated in FIG. 9 that combines aspects of system 110 in FIG. 6 and system 210 in FIG. 7. In this embodiment, system 410 was used in one or more experimental test as will be described herein. System 410 includes a container 412 that defines a cavity to which microwave energy 426 is introduced. An enclosure 414, similar to enclosure 214, may be provided that is configured for being sealed and receiving a sample material 1 therein. A pump or vacuum 422 provides pumping forces to the fluid flow of the enclosure 414, thereby applying a pressure therein to the sample 1. A sealing member 417 may be provided for providing a pressure tight seal of the container 412. The pump or vacuum 422 provides pumping forces along a line 418 to the enclosure 414, thereby applying a pressure therein to the sample 1. The line 418 may be in further communication with a cold trap 450, or a desiccant, and a pressure gauge 430 that monitors the pressure in enclosure 414.

The microwave containment system can be the same as the vacuum cavity, or the vacuum cavity and microwave cavity can be separate. In one case, the vacuum cavity can be interior to the microwave cavity, on the other hand the microwave cavity can be interior to the vacuum cavity, or one in the same. Multiple vacuum enclosures can be included such as when each sample has its own microwave transparent vacuum canister. A single large vacuum chamber can contain multiple samples.

The one or more systems disclosed herein combine a pressure vacuum and an electromagnetic source in order to dry one or more samples. The electromagnetic source may be a microwave. Microwaves are electromagnetic waves having wavelength (peak to peak distance) varying from 1 millimeter to 1 meter (frequency of these microwaves lies between 0.3 GHz and 30 GHz) and have greater frequency than lower frequency radio waves so they can be more tightly concentrated. For lower frequencies, coupling of electromagnetic energy into the cavity may not be possible, and large areas of the cavity may have dead spots or no RF energy at all. If the frequency is too low, the cavity would behave as a capacitive load with no power delivered. Microwaves bounded by the inside of the conducting enclosure produce volumetrically high and low energy locations. This is caused by wavelength of the microwaves being on the order of ½ the size of the cavity or less, or on the order of ½ to 10 times smaller than the dimensions of the cavity offering many electromagnetic modes. Hence, constructive and destructive electromagnetic field configurations form and allow for uniform volumetric heating of a sample. Even better uniformity of the microwave energy is accomplished using mode stirring, such as by rotating samples. This dynamically causes the field configurations interior to the cavity to dynamically change. Typical mode stirring can be accomplished using a mechanical stirrer. Typical structures look like a fan with conducting blades that force different coupling modes into the chamber. Optical sources such as infrared irradiative sources, do not have these properties as the cavity is millions of times larger than the wavelength. The principles guiding the physics on these large scales are entirely different. Infrared energy does not penetrate the surface more than a few microns, and the sample surfaces are heated by heat conduction flow resulting from the temperature differential between the surface and center of the sample. The microwaves, which inherently and instantly penetrate to interior of the sample, result in the water absorbing the microwave energy and becoming heated within the core of the sample. The temperature of the water is increase, allowing fast transfer of moisture out of the sample. Hence, microwave drying is rapid, more uniform and energy efficient compared to conventional hot air drying. The problems in microwave drying, however, include product damage caused by excessive heating due to poorly controlled heat and mass transfer. In this manner, the combination of a vacuum force and a microwave source are used to counter balance each other. Here, on one hand, the vacuum reduces the pressure thus further evaporating the water in the sample. This reduces sample temperature as water is evaporated and removed. On the other hand, the microwave source is directed at the sample, whereby the microwave energy is absorbed increasing the thermal energy of the water molecules; thus counteracting the cooling process from the forced evaporation. Hence the samples can remain at relatively constant temperatures throughout a drying process.

One or more methods are disclosed herein. Since the Microwaves will tend to heat and the Vacuum cool the pucks, the one or more methods herein may attempt to maintain the sample material at a constant temperature of 20 degrees C. during the entire drying cycle. Conversely, the object is to not exceed a predetermined sample temperature such as 50 degrees C. The power or duty cycle of the microwave controller is adjusted in concert with the pressure to regulate the temperature and pressure and maximize mass transfer with the vacuum pump.

One or more sensors are in communication with the one or more systems disclosed herein to monitor one or more characteristics of the method and process. The one or more sensors may include a temperature sensor that measures the temperature inside of the containers described herein. The one or more sensors may be a thermocouple, a thermistors (PTC: Positive Temperature Coefficient/NTC: Negative), and an RTD Resistance Temperature Detector (USA)/PT100 (Europe). Alternatively, an infrared based measurement device, including an IR thermocouple. An infrared thermometer measures temperature by detecting the infrared energy emitted by all materials which are at temperatures above absolute zero, (0° Kelvin). The IR part of the spectrum spans wavelengths from 0.7 micrometers to 1000 micrometers (microns). Within this wave band, only frequencies of 0.7 microns to 20 microns are used for practice, because the IR detectors currently available to industry are not sensitive enough to detect the very small amounts of energy available at wavelengths beyond 20 microns. Infrared Thermocouples (IRt/c's) have an infrared detection system which receives the heat energy radiated from objects the sensor is aimed at, and converts the heat passively to an electrical potential. A millivolt signal is produced, which is scaled to the desired thermocouple characteristics. Since some IRt/c's are self-powered devices, and rely only on the incoming infrared radiation to produce the signal through thermoelectric effects, the signal will follow the rules of radiative thermal physics, and be subject to the non-linearities inherent in the process. However, over a range of temperatures, the IRt/c output is sufficiently linear to produce a signal which can be interchanged directly for a conventional t/c signal. For example, specifying a 2% match to t/c linearity results in a temperature range in which the IRt/c will produce a signal within 2% of the conventional t/c operating over that range. Specifying 5% will produce a somewhat wider range, etc. The IRt/c is rated at 1% (of reading) repeatability and to have no measurable long term calibration change, which makes it well suited for reliable temperature control.

Figure 10:
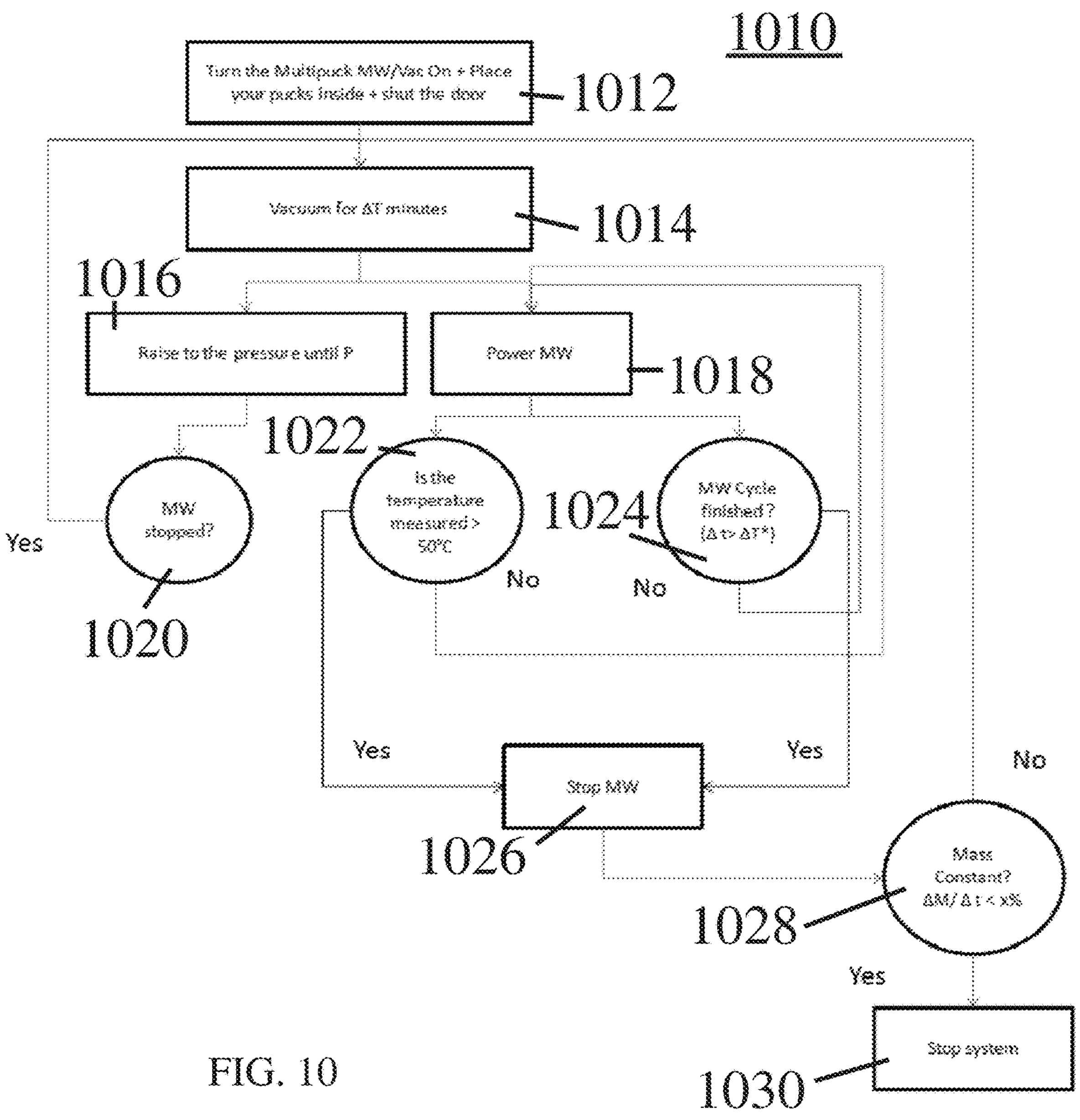
FIG. 10 is a flowchart depicting one or more methods according to one or more embodiments disclosed herein.
Figure 11:
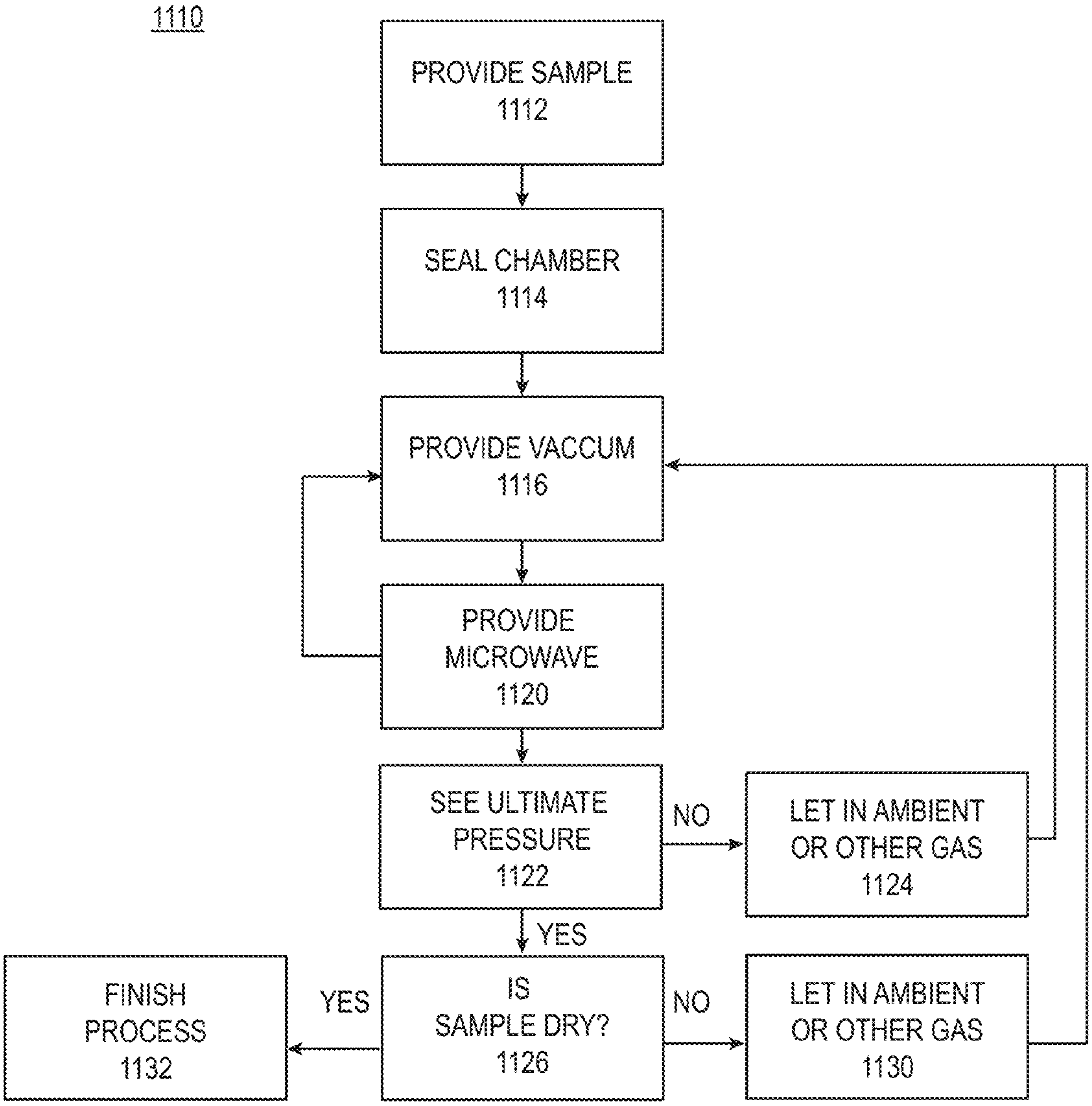
FIG. 11 is a flowchart depicting one or more methods according to one or more embodiments disclosed herein.

The one or more methods disclosed herein are illustrated well in the flowcharts of FIG. 10 and FIG. 11. As illustrated in FIG. 10, a method 1010 provides turning on the vacuum source, placing the sample material inside of the enclosure, and shutting the door to seal the enclosure 1012. As further described herein, each of the steps of 1012 may be simultaneously or subsequently provided. The method 1010 may further include providing vacuum forces for a defined period of time 1014. The vacuum forces may be provided by the pumping systems disclosed herein.

The method 1010 may further include applying pressure through a vacuum force until a desired pressure is reached 1016. This may be monitored by one or more pressure gauges disclosed herein. The method 1010 may further include powering on the microwave source 1018. Microwave source may be provided by the one or more microwave sources disclosed herein.

The method 1010 may further include determining if the temperature measured is greater than 50 degrees C. 1022. If the measured temperature is above 50 degrees C., meaning the temperature is approaching not being relatively constant throughout the drying cycle, then the microwave source is stopped 1026. If the measured temperature remains below 50 degrees C., then additional microwave energy may be applied or, alternatively, the microwave energy may be ceased and pressure held. The method 1010 may further include determining if the microwave cycle has finished 1024. This may be accomplished with reference to a predetermined microwaving period of time. If it is determined that the microwave period of time is over, then the microwave is stopped 1026. If it is determined that that microwave period of time is not over, then additional microwave source is provided. Once the microwave is stopped in either of 1026 or 1020, the mass constant is measured 1028 of the sample material. If it is determined that the sample is dry, then the system is stopped 1030. Dryness can be measured by weighing, humidity instrumentation, or ultimate pressure. As long as water is evaporating, it is "out-gassing" and the ultimate pressure is not achieved. To calibrate, the ultimate pressure is measured without a sample, and is the lowest pressure attainable after all water is pumped off the chamber walls. Water is bound to the walls even in an empty chamber. In other words, the one or more methods include pumping (vacuum) an empty chamber, recording the minimum or best vacuum pressure obtained, which in one or more experiments, may be about 2 or 3 Torr, placing the sample in the chamber and the method includes further pumping (vacuum) of the chamber containing the sample. The pressure will remain higher than the ultimate pressure until all the water is evaporated. For this example, when the sample chamber reaches 2 or 3 Torr, it is dry.

One or more additional methods are illustrated in FIG. 11 and generally designated 1110. The one or more methods 1110 may include providing a sample to be dried 112. The one or more methods 1110 may include sealing the chamber to which the sample is in 1114. The one or more methods 1110 may include providing a vacuum to the chamber 1116. The one or more methods 1110 may include providing a microwave to the chamber 1120. The step of providing microwave 1120 may be carried out in a step-wise function or a duty cycle, meaning on again, off again in time thus obtaining the capability to adjust the average power delivered to the sample, as described in further detail herein. The one or more methods 1110 may include determining if the ultimate pressure has been reached in the chamber 1122. If the ultimate pressure has not been reached, additional gas, such as ambient, nitrogen, or helium can be added to the chamber 1124 for a specified time, at which point, the vacuum step 1116 and microwave step 1120 begin again. If the ultimate pressure has been reached, determine if the sample is dry 1126. If the sample is not dry, additional gas, such as ambient, nitrogen, or helium can be added to the chamber 1130, at which point, the vacuum step 1116 and microwave step 1120 begin again. If the sample is dry, then the process is finished 1132. Possible heating energy can be achieved by controlling the duty cycle as in FIG. 12 or by controlling the High voltage power supply of the magnetron to attain a specified percent of power.

One can tell when a sample is dry because the sample stops losing weight, or humidity sensor indicator, temperature stabilizes at zero microwave power, as microwaves counter balance the thermodynamic cooling of the sample, or ultimate pressure is obtained. The temperature of the samples is monitored via IR thermocouple and a feed back and control system keeps the microwave energy from heating the cores above a certain value, for example, 40 C, 50 C or 60 C.

Alternatively, a regular microwave oven could be used without the expense of making it vacuum worthy. Then each porous sample that was to be dried could be inserted into its own personal small vacuum chamber and placed into the microwave oven. Inside would be quick release vacuum hookups to reduce pressure for each individual sample. The microwave disclosed methods and instrumentation would be then used to monitor each sample separately, with feedback to a programmable computer to monitor and control microwave power directed to each sample. Alternatively, an economical microwave oven could be modified to accept a single vacuum cavity where one or more samples can reside for drying and monitoring.

Shrink Wrapping Cores and Aggregates Duel Use

Asphalt samples, cores, and aggregates may have a shrink wrap applied thereon for sealing off the core from water intrusion during a volume determination method that uses water. For example, in one or more embodiments, the volume of a core may be determined by submerging the core in a water bath, and measuring the volume increase of the water bath/core combination. Or the weight of the dry sample in air compared to the weight submerged in a fluid or powder allows for the buoyancy effects to calculate volume provided that the specific gravity of the fluid is known. However, for porous materials, water can infiltrate into voids in the core and then the water is difficult to remove. Furthermore and more importantly, water seepage to the interior of the core gives a false mass reading in the water, thus resulting in an underestimate of the actual volume of the sample. In other words, if the core needs to be subsequently weighed in order to, for example, determine density of the core, the infiltrated water impacts the accuracy of the weight measurement and the volume calculation.

A shrink wrap envelope may be applied to the core or pavement sample in order to seal off the core interior while conforming to the complex shape of the surface features before the core is submerged in water. The shrink wrap may be heated with microwave heating, infrared heating, or any other suitable heat source. A vacuum may also be applied. A slight or greater increase in pressure may also be used to make the shrink wrap material flow into the pits and surface of the asphalt core and/or aggregates. For example, one or more shrink wrapping techniques may be employed that are described in U.S. Pat. Nos. 6,615,643 and 6,615,643, the entire contents of which are hereby incorporated by reference. Shrink wrap material may be of a conformal shape to the sample such as in a cylindrical conforming shape, or it may be rectangular in shape and conform to the sample leaving excess material of negligible volume in the finished sealing product.

The shrink wrap can be coated with a microwave lossy material such as carbon or conductor or a semiconductor to increase the energy absorption to the bag and more quickly shrink the plastic. Conversely, if the envelope material is not a shrinkable polymer, forming the polymer to the surface imperfections can be accomplished by heating the material while applying vacuum or pressure cycles. The polymer or bag can be wrapped around the core and inserted into the vacuum chamber. The procedure may be to decrease pressure so that the bag adheres to the surface, while applying energy to mold and shrink the bag.

A good vacuum at most can apply about 14 psi to the surface area of the shrinkable material. However adding positive pressure allows for much higher surface forces to be applied to the shrinkable bag. For example, 14, 28, 42 or up to 100 psi can be applied easily. One possible method for sealing may include inserting a sample, pulling a good vacuum, heating the bag and sealing the bag, then bringing the system back to atmospheric pressure, and then adding air pressure to further set the shrinkable bag, while still adding microwave energy. IR energy could also be used to shrink the bag.

Once the vacuum has set the bag, a gas such as ambient air, or dry air or nitrogen could be added to the chamber to increase pressure. Positive pressures could be formed further pushing the polymer or bag into the surface imperfections. Typical shrink bags tend to not form precisely into the imperfections, making the material sample look like it has a larger volume when the Archimedes principle or rather water bath is used to determine volume or density. Adding positive pressure reduces this non conformal effect.

In another approach, convection principles only could be used whereby the vacuum is made, then positive pressure is applied with respect to atmospheric pressure. This will help set the bag.

In general the samples in any case could rotate and spin in the microwave vacuum oven. Turnstile tables are controlled inside the microwave or vacuum chamber to the proper speed and position. These could be rotated through hermitically sealed shafts, or through a wind up mechanism. Several axes of rotation can be used. The turntables are microwave invisible and could be of a plastic, ceramic, or Pyrex® glass.

Experimental Results

The following experiments have been made using a microwave source in which a plastic vacuum chamber (pycnometer) has been placed interior to the microwave oven. A hole is drilled on top of the microwave so that a hose connects the Vacuum chamber, the pumping installation and the pressure gage. This is illustrated schematically in FIG. 6.

In early experiments, the pumping installation included a no water trap where the water evaporated directly in the vacuum pump, whereas later tests included a desiccant 450 illustrated in FIG. 9 and a cold trap 350 illustrated in FIG. 8. The plastic vacuum chamber included a spherical shape sealed on bottom and top that was sealed with a silicon o-ring or a flat layer of silicon In the one or more experiments, the vacillation of the Microwave and the Vacuum, for example, a cycle during which the Microwave oven heats the sample only when the vacuum pressure is raised to a certain level, is advantageous, namely, by letting "dry" air in the vacuum chamber. Here dry is in comparison to the chamber interior, mainly constituted of water vapor. The proportion of water vapor is decreased and therefore the relative humidity becomes lower. As a result, the condensation of water vapor on the surfaces of the vacuum chamber, which increase the efficiency of the drying, is limited. When the vacuum is low enough, below about 10 T, the microwave electric fields strip electrons off the air and water molecules. At this low pressure, the mean free path of the gas molecules is long enough that the electrons can accelerate via the E fields and ionize another particle. Thus avalanche plasma was formed. This plasma aids in mode stirring and uniform heating as it becomes randomly in the chamber. To control the plasma, either the electric field is reduced, or the pressure is raised above the mean free path of the molecules. As the water vapor decreases and the samples become dry, exciting the plasma becomes less probable, and finally ceases to exist below the pressure threshold of about 10 to 15 Torr.

Experimental Results I

In each of the following experiments, the system 110 disclosed in FIG. 6 was used to test the drying process of asphalt cores (referred to as "pucks" in the industry), except the cold trap 150 was not employed. Tests were performed on small Marshall, larger Superpave pucks, and made of coarse and fine aggregates, and the tests were carried out with and without microwaves. The microwave source was added with a controlled duty cycle according to the diagram of FIG. 12. The duty cycle can adjust the average delivered power from 0 percent to 100 percent.

Figure 12:
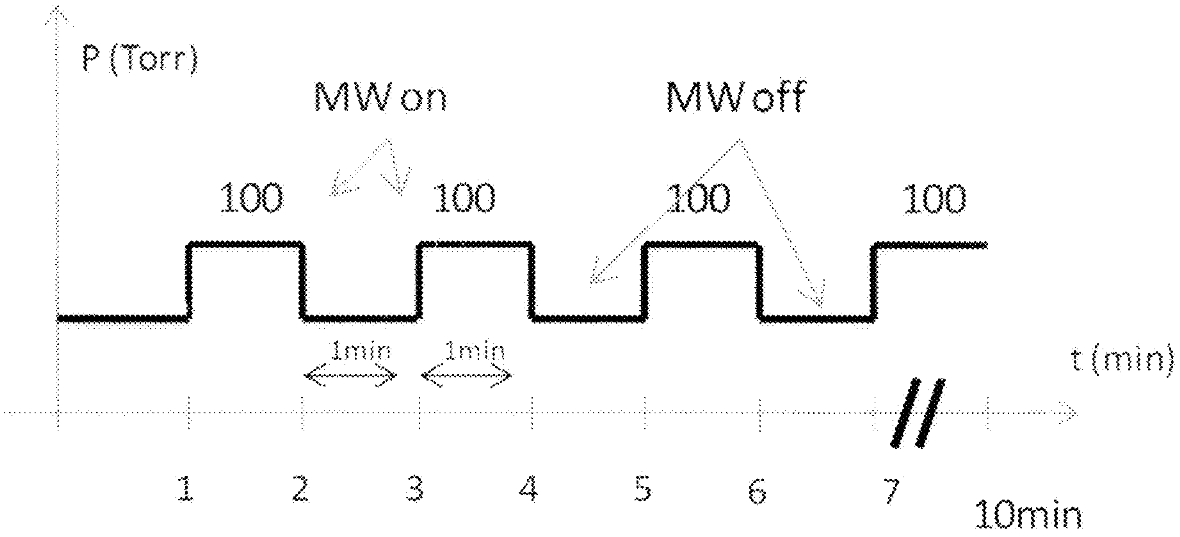
FIG. 12 is a chart showing pressure as a function of time, as well as microwave energy input according to one or more experiments.

As illustrated in FIG. 12, a cycle of eight minutes was used, with alternation of 1 minute of vacuum added (during which the microwave is not being provided), and 1 minute of pressure increase (where microwave is being provided). The pressure raise in these one or more experiments approached about 30 Torr.

Other uses include a portable field device for quick and accurate soil moisture measurements.

Certain samples tested and experimental results of those tests are detailed in TABLE I.

TABLE I

| Puck | Initial water content | Final water content after 8 minutes | Time to "fully" dry the puck (0.1 g or less left) | Temperature commonly reached | Vacuum level commonly reached |
|---|---|---|---|---|---|
| Small Aggregate, 1 kg to 1.5 kg | 4 g to 7 g | 0.1 g to 0.5 g | 15 minutes | 35° C. to 45° C. | 8 to 11 Torr |
| Big Aggregate, 4.8 kg, low absorption | Around 4 g | Around 0.3 g | 15 minutes | 35° C. to 45° C. | 8 to 11 Torr |
| Big Aggregate, 4.7 kg, high absorption | Around 40 g | 15 g to 20 g | 25 minutes | 40° C. to 50° C. | 8 to 11 Torr |

Certain samples tested and experimental results of those tests are detailed in TABLE II.

TABLE II

| Soils | Initial water content | Mass of Soil tested | Time to "fully" dry the puck (Absorption = "8%" after 2 consecutive test) | Temperature commonly reached | Vacuum level commonly reached |
|---|---|---|---|---|---|
| Sand | Around 8% | 250 g | 5 × 8 minutes = 40 min | 30° C. to 60° C. | 8 to 11 Torr |
| Franken Soil | Around 8% | 250 g | 4 × 8 minutes = 32 min | | |

Certain samples tested and experimental results of those tests are detailed in TABLE III.

TABLE III

| Rocks | Initial water content | Mass of Rocks tested | Final water content after 8 minutes | Temperature commonly reached | Vacuum level commonly reached |
|---|---|---|---|---|---|
| Random rocks | 4 g to 5 g | Around 1 kg | Around 0.3 g | 30° C. to 40° C. | 8 to 11 Torr |

The one or more experiments conducted herein were measured with respect to a vacuum only cycle and a vacuum with microwave cycle. The experimental results of those tests are detailed in TABLE IV.

TABLE IV

| PUCK | Cycle of 8 minutes: Vacuum Cycle Only: Initial mass of water | Final mass of water | % water pumped (Mi-Mf)/Mi | Vacuum + MW Cycles: Initial mass of water | Final mass of water | % water pumped (Mi-Mf)/Mi | Factor of Improvement due to the Combined cycle Vac + MW |
|---|---|---|---|---|---|---|---|
| Small, fine Agg | 5.4 | 3.2 | 40.74% | 5.1 | 0.5 | 90.2% | 121.4% |
| Small, coarse Agg | 7.7 | 4.6 | 40.26% | 5.4 | 0.2 | 96.3% | 139.2% |
| Big, low absorption | 4.6 | 0.7 | 84.78% | 4.3 | 0.3 | 93% | 9.69% |
| Big, high absorption | 35.1 | 22.6 | 35.61% | 40 | 20.5 | 48.75% | 36.9% |

The one or more experiments conducted herein were measured with respect to a vacuum only cycle and a vacuum with microwave cycle. The experimental results of those tests are detailed in TABLE V.

TABLE V

| PUCK | Vacuum Cycle Only: Initial mass of water | Final mass of water | % water pumped (Mi-Mf)/Mi | Vacuum + MW Cycles: Initial mass of water | Final mass of water | % water pumped (Mi-Mf)/Mi | Factor of Improvement due to the Combined cycle Vac + MW |
|---|---|---|---|---|---|---|---|
| Big, low absorption | 3.4 | 0.1 | 97% | 5.2 | 0.1 | 98% | 1% |
| Big, high absorption | 41.7 | 21.1 | 49.4% | 40.8 | 10.4 | 74.5% | 51% |

The one or more experiments conducted herein were measured with respect to a vacuum only cycle and a vacuum with microwave cycle. The experimental results of those tests are detailed in TABLE VI.

TABLE VI

| Puck | Cycle of 25 minutes: Vacuum Cycle Only: Initial mass of water | Final mass of water | % water pumped (Mi-Mf)/Mi | Vacuum + MW Cycles: Initial mass of water | Final mass of water | % water pumped (Mi-Mf)/Mi | Factor of Improvement due to the Combined cycle Vac + MW |
|---|---|---|---|---|---|---|---|
| Big, high absorption | 41.7 | 5 | 88% | 40.8 | 0 | 100% | 13.6% |

The combined cycles are more than twice as efficient for small pucks (which can be dried quickly).

For bigger pucks (for which the drying last longer), the gain is not as high but still significant: 10% to 50%.

In these one or more experiments, where substandard results were determined, it was determined that this was mostly likely the cause of an inability to hold vacuum or attain a quality vacuum due to vacuum leaks.

Experimental Results II

In this sets of experimental tests, the system 110 of FIG. 6 was used, including a cold trap 150 which included a microwave choke filter. Here, the choke is designed for safety to keep the microwaves from escaping through the vacuum aperture. In the one or more experiments, this microwave filter was a copper abrasive pad stuffed in the vacuum line to make sure microwave energy would not leak into the room. The operator records drying time, mass and temperature before and after each testing.

In addition the operator performs the MW/Vacuum cycles. That is to say that the operator runs the pump, waits for 1 minute, turns the microwave on while raising the pressure (manually through a button on top of the cold trap 150), and then turns the microwave off and lets the pressure down in a cycle that may be later repeated. While in this experiment, the operator records the vacuum pressure read by the pressure gage 130.

Figure 13:
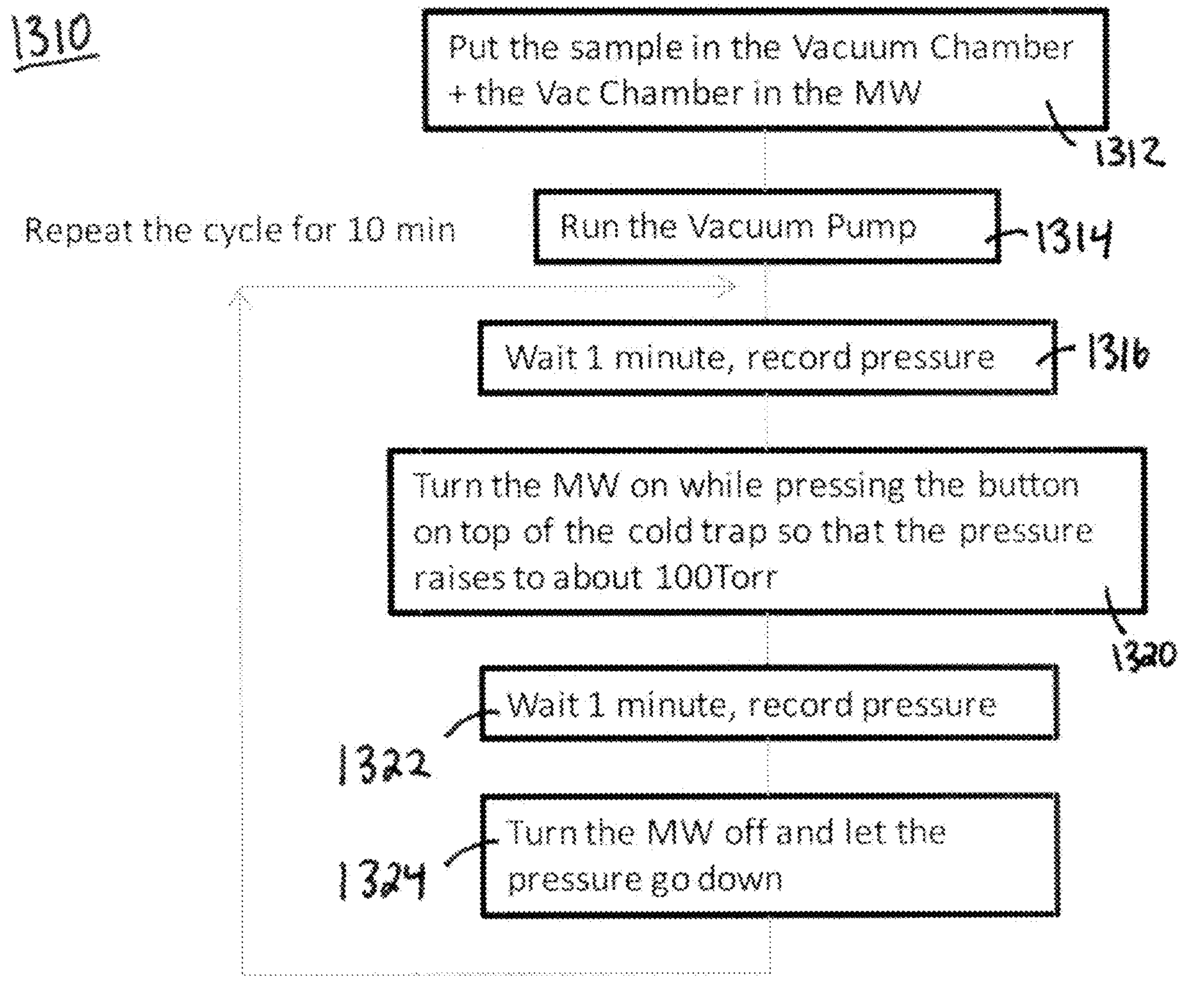
FIG. 13 is a flowchart depicting one or more methods according to one or more embodiments disclosed herein.

This process is described in detail in the flowchart of FIG. 13, with FIG. 12 illustrating the application of microwave energy and vacuum forces as a function of time. As illustrated in FIG. 13, a method 1310 is provided and used in these one or more experiments. The method 1310 includes putting the sample in the vacuum chamber and the vacuum chamber in the microwave 1313 no see. The method 1310 includes running the vacuum pump 1314. The method 1310 includes waiting one minute (while vacuum is held), and recording pressure 1316. The method 1310 includes turning the microwave on while pressing a button on top of the cold trap that was in communication with a valve to allow a pressure increase to about 100 Torr 1310. The method 1310 includes waiting about one minute, then recording the pressure 1322. The method 1310 includes turning off the microwave and letting the pressure reduce 1324. The cycle is then repeated according to the flowchart. Dryness was usually determined by the ability to attain a predetermined vacuum level such as the ultimate pressure.

In these one or more experiments, the test compared a conventional asphalt drying unit with the one or more systems disclosed herein. In order to do so, the test compared the time necessary to dry the sample as well as the quantity of water removed.

In order to quantify theses differences, an improvement factor (δ%) was defined:

The Average mass of Water removed by the MW/Vac system (in percentage), should be δ% more than the Average mass of Water removed by the ADU: Y(MW−VAC)=(1+δ%).X(ADU)

The Average time to dry a sample using the MW/Vac system (in percentage), should be δ% less than the Average time to dry the sample using the ADU: Y(MW-VAC)=(1−δ%).X(ADU)

As far as performance of the large puck made of coarse graduates, an improvement was observed by the one or more systems disclosed herein over the ADU because, while removing similar amounts of water, the one or more systems disclosed herein accomplished doing so in about 25% less time than the ADU.

As far as performance of the small puck made of coarse aggregates, within the same drying period, the one or more systems disclosed herein removed about 20% more water.

As far as performance of the small puck made of small aggregates, the one or more systems disclosed herein did not perform as well as the ADU, which had twice the drying time, but also removed twice as much water.

As far as performance for rocks, the drying time with the one or more systems disclosed herein was 75% less than the drying time for the ADU, however, the amount of water removed from the rocks was half of that removed from the ADU.

As far as performance for sands, the one or more systems disclosed herein were more efficient than the ADU.

As far as performance of water, the one or more systems disclosed herein remove 99% of water, whereas the ADU removed less.

Additional Experimental Results

In the tables that follow, various experiments were conducted. In the section of each respective table labeled "Equipment use," the equipment used and subject matter being tested is listed. Any relevant conditions of experiment are listed in the "Conditions of experiment" section.

TABLE VII

| | |
|---|---|
| Equipment used | Pump<br>"Rice test" Chamber<br>Pressure pirani gage #2<br>Small asphalt puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 400 |
| 10 | 50 |
| 20 | 16 |
| 30 | 14 |
| 40 | 13 |
| 50 | 12 |
| 60 | 11 |
| 70 | 11 |
| 80 | 11 |
| 90 | 11 |
| 100 | 10 |
| 110 | 10 |
| 120 | 9.5 |
| 150 | 9 |
| 180 | 8.5 |
| 220 | 8 |
| Minitial (g) | 1097.8 |
| Mfinal (g) | 1095.2 |
| % loss [Mi − Mf]/Mi | 0.24% |

TABLE VIII

| | |
|---|---|
| Equipment used | Pump<br>"Rice test" Chamber<br>Pressure pirani gage #2<br>Small concrete puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 250 |
| 10 | 50 |
| 20 | 17 |
| 30 | 15 |
| 40 | 14 |
| 50 | 14 |
| 60 | 13 |
| 70 | 13 |
| 80 | 13 |
| 90 | 12 |
| 100 | 12 |
| 110 | 12 |
| 120 | 12 |
| 150 | 11 |

TABLE VIII-continued

| | |
|---|---|
| 180 | 11 |
| 220 | 11 |
| Minitial (g) | 979.9 |
| Mfinal (g) | 977 |
| % loss [Mi − Mf]/IV | 0.30% |

TABLE IX

| | |
|---|---|
| Equipment used | Pump<br>"Rice test" Chamber<br>Pressure pirani gage #2<br>Big asphalt puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 90 |
| 10 | 20 |
| 20 | 15 |
| 30 | 14 |
| 40 | 13 |
| 50 | 13 |
| 60 | 13 |
| 70 | 12 |
| 80 | 12 |
| 90 | 12 |
| 100 | 11 |
| 110 | 11 |
| 120 | 11 |
| 150 | 11 |
| 180 | 11 |
| 220 | 10 |
| Minitial (g) | 4822.6 |
| Mfinal (g) | 4818.8 |
| % loss [Mi − Mf]/Mi | 0.08% |

TABLE X

| | |
|---|---|
| Equipment used | Pump<br>"Rice test" Chamber<br>Pressure pirani gage #2<br>Empty Chamber |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 540 |
| 10 | 35 |
| 20 | 5.6 |
| 30 | 4.2 |
| 40 | 4 |
| 50 | 4 |
| 60 | 4 |
| 70 | 4 |
| 80 | 4 |
| 90 | 4 |
| 100 | 4 |
| 110 | 4 |
| 120 | 4 |

TABLE XI

| | |
|---|---|
| Equipment used | Pump<br>"Rice test" Chamber<br>Pressure pirani gage #2<br>Water in cup |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 300 |
| 10 | 46 |
| 20 | 12 |
| 30 | 8 |
| 40 | 6.2 |
| 50 | 5.8 |
| 60 | 5.8 |
| 70 | 5.8 |
| 80 | 5.8 |
| 90 | 5.8 |
| 100 | 5.8 |
| 110 | 5.8 |
| 120 | 5.8 |

TABLE XII

| | |
|---|---|
| Equipment used | Pump<br>"Rice test" Chamber<br>Pressure pirani gage #2<br>Water in sponge |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 260 |
| 10 | 50 |
| 20 | 13 |
| 30 | 9.5 |
| 40 | 7 |
| 50 | 6.4 |
| 60 | 6.4 |
| 70 | 6.4 |
| 80 | 6.4 |
| 90 | 6.4 |
| 100 | 6.4 |
| 110 | 6.4 |
| 120 | 6.4 |

TABLE XIII

| | |
|---|---|
| Equipment used | Pump<br>"Rice test" Chamber<br>Pressure pirani gage #2<br>Small asphalt puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 150 |
| 10 | 44 |
| 20 | 14 |
| 30 | 11 |
| 40 | 9.7 |
| 50 | 8 |
| 60 | 7.4 |

TABLE XIII-continued

| | |
|---|---|
| 70 | 7 |
| 80 | 7 |
| 90 | 7 |
| 100 | 7 |
| 110 | 7 |
| 120 | 7 |
| 150 | 7 |
| 180 | 7 |
| 220 | 7 |
| Minitial (g) | 1098 |
| Mfinal (g) | 1095.7 |
| % loss | 0.21% |

TABLE XIV

| | |
|---|---|
| Equipment used | Pump<br>"Rice test" Chamber<br>Pressure pirani gage #2<br>Small concrete puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 230 |
| 10 | 46 |
| 20 | 16 |
| 30 | 13 |
| 40 | 11 |
| 50 | 9 |
| 60 | 8.5 |
| 70 | 8 |
| 80 | 8 |
| 90 | 7.8 |
| 100 | 7.8 |
| 110 | 7.8 |
| 120 | 7.8 |
| 150 | 7.8 |
| 180 | 7.8 |
| 220 | 7.8 |
| Minitial (g) | 983.8 |
| Mfinal (g) | 980.1 |
| % loss | 0.38% |

TABLE XV

| | |
|---|---|
| Equipment used | Pump<br>"Rice test" Chamber<br>Pressure pirani gage #2<br>Big concrete puck |
| Conditions of experiment | Pumping by the top<br>Pressure measurement by the side |

| Pressure Measurement | |
|---|---|
| t (s) | P1 chambre (torr) ↘ |
| 0 | 800 |
| 5 | 120 |
| 10 | 29 |
| 20 | 18 |
| 30 | 14 |
| 40 | 11 |
| 50 | 10 |
| 60 | 9 |
| 70 | 9 |
| 80 | 9 |
| 90 | 8.5 |
| 100 | 8.5 |
| 110 | 8.5 |
| 120 | 8.5 |
| 150 | 8.5 |

TABLE XV-continued

| | |
|---|---|
| 180 | 8.5 |
| 220 | 8.5 |
| Minitial (g) | 4822.6 |
| Mfinal (g) | 4819.7 |
| % loss | 0.06% |

TABLE XVI

| | |
|---|---|
| Equipment used | Pump<br>"Rice test" Chamber<br>Pressure pirani gage #2<br>Microwave<br>Desiccant<br>Empty Chamber |
| Conditions of experiment | Pumping by the top<br>Pressure measurement by the top |
| Schematic drawing: | FIG. 9 |

Pressure Measurement

| t (s) | P1 chambre (torr) ↘ |
|---|---|
| 10 | 400 |
| 20 | 110 |
| 30 | 70 |
| 40 | 42 |
| 50 | 29 |
| 60 | 20 |
| 70 | 15 |
| 80 | 12 |
| 90 | 10 |
| 100 | 8.5 |
| 110 | 7 |
| 120 | 6.4 |
| 130 | 5.6 |
| 140 | 5.2 |
| 150 | 4.6 |
| 160 | 4.2 |
| 170 | 3.8 |
| 180 | 3.5 |
| 190 | 3.3 |
| 200 | 3 |
| 210 | 2.8 |
| 220 | 2.8 |
| 230 | 2.5 |
| 240 | 2.4 |

TABLE XVII

| | |
|---|---|
| Equipment used | Pump + Plexiglas cylindrical chamber<br>Pressure pirani gage #2<br>Microwave + Desiccant<br>10 gram of water in cup |
| Conditions of experiment | Pumping by the top<br>Pressure measurement by the top |
| Schematic drawing: | FIG. 9 |

Pressure Measurement

| t (s) | P1 chambre (torr) ↘ |
|---|---|
| 10 | 110 |
| 20 | 80 |
| 30 | 70 |
| 40 | 48 |
| 50 | 40 |
| 60 | 30 |
| 70 | 32 |
| 80 | 36 |
| 90 | 29 |
| 100 | 35 |
| 110 | 40 |
| 120 | 33 |
| 130 | 29 |
| 140 | 24 |

TABLE XVII-continued

| | |
|---|---|
| 150 | 23 |
| 160 | 21 |
| 170 | 20 |
| 180 | 20 |
| 190 | 19 |
| 200 | 19 |
| 210 | 17 |
| 220 | 17 |
| 230 | 15 |
| 240 | 15 |

TABLE XVIII

| | |
|---|---|
| Equipment used | Pump + Plexiglas cylindrical chamber<br>Pressure pirani gage #2<br>Microwave + Desiccant<br>Small asphalt puck |
| Conditions of experiment | Pumping by the top<br>Pressure measurement by the top |
| Schematic drawing: | FIG. 9 |

Pressure Measurement

| t (s) | P1 chambre (torr) ↘ |
|---|---|
| 0 | 800 |
| 5 | 440 |
| 10 | 280 |
| 20 | 100 |
| 30 | 68 |
| 40 | 40 |
| 50 | 21 |
| 60 | 15 |
| 70 | 11 |
| 80 | 9.5 |
| 90 | 8 |
| 100 | 7.4 |
| 110 | 7.4 |
| 120 | 6.8 |
| 130 | 6.8 |
| 140 | 6.8 |
| 150 | 6.6 |
| 160 | 6.6 |
| 170 | 6.6 |
| 180 | 6.6 |
| 190 | 6.6 |
| 200 | 6.6 |
| 210 | 6.6 |
| 220 | 6.6 |
| 230 | 6.6 |
| 240 | 6.6 |
| Minitial (g) | 1110.8 |
| Mfinal (g) | 1110.5 |
| % loss | 0.03% |

TABLE XIX

| | |
|---|---|
| Equipment used | Pump + Plexiglas cylindrical chamber<br>Pressure pirani gage #2<br>Microwave + Desiccant<br>Small asphalt puck |
| Conditions of experiment | Pumping by the top<br>Pressure measurement by the top |
| Schematic drawing: | FIG. 9 |

Pressure Measurement

| t (s) | P1 chambre (torr) ↘ |
|---|---|
| 10 | 370 |
| 20 | 110 |
| 30 | 80 |
| 40 | 74 |
| 50 | 62 |
| 60 | 40 |

TABLE XIX-continued

| | |
|---|---|
| 70 | 33 |
| 80 | 29 |
| 90 | 28 |
| 100 | 32 |
| 110 | 34 |
| 120 | 35 |
| 130 | 38 |
| 140 | 40 |
| 150 | 42 |
| 160 | 42 |
| 170 | 46 |
| 180 | 46 |
| 190 | 46 |
| 200 | 50 |
| 210 | 56 |
| 220 | 56 |
| 230 | 56 |
| 240 | 56 |
| 270 | 48 |
| 300 | 52 |
| 330 | 58 |
| 360 | 62 |
| 390 | 54 |
| 420 | 48 |
| 450 | 46 |
| 480 | 44 |
| 510 | 42 |
| 540 | 40 |
| Minitial (g) | 1109.6 |
| Mfinal (g) | 1098 |
| % loss | 1.05% |

TABLE XX

| | |
|---|---|
| Equipment used | Pump + Plexiglas cylindrical chamber<br>Pressure pirani gage #2<br>Microwave + Desiccant<br>Small asphalt puck |
| Schematic drawing: | FIG. 9 |

| Pressure Measurement | |
|---|---|
| t (s) | P1 chambre (torr) ↘ |
| 10 | 460 |
| 20 | 240 |
| 30 | 100 |
| 40 | 70 |
| 50 | 40 |
| 60 | 23 |
| 70 | 17 |
| 80 | 17 |
| 90 | 16 |
| 100 | 17 |
| 110 | 17 |
| 120 | 17 |
| 130 | 18 |
| 140 | 20 |
| 150 | 20 |
| 160 | 20 |
| 170 | 20 |
| 180 | 22 |
| 190 | 22 |
| 200 | 24 |
| 210 | 27 |
| 220 | 27 |
| 230 | 30 |
| 240 | 32 |
| 270 | 32 |
| 300 | 28 |
| 330 | 23 |
| 360 | 20 |
| 390 | 19 |
| 420 | 17 |
| 450 | 16 |
| 480 | 14 |
| 510 | 14 |

TABLE XX-continued

| | |
|---|---|
| 540 | 13 |
| 570 | 12 |
| 600 | 11 |
| Minitial (g) | 1103.1 |
| Mfinal (g) | 1096.7 |
| % loss | 0.58% |

| Conditions of experiment |
|---|
| Pumping by the top<br>Pressure measurement by the top |

TABLE XXI

| | |
|---|---|
| Equipment used | Pump + Plexiglas cylindrical chamber<br>Pressure pirani gage #2<br>Microwave + Water filter as cold trap<br>Empty Chamber |
| Conditions of experiment | Pumping by the top<br>Pressure measurement by the top |
| Schematic drawing: | FIG. 8 |

| Pressure Measurement | |
|---|---|
| t (s) | P1 chambre (torr) ↘ |
| 10 | 14 |
| 20 | 4.4 |
| 30 | 3.4 |
| 40 | 2.6 |
| 50 | 2 |
| 60 | 1.8 |
| 70 | 1.7 |
| 80 | 1.1 |
| 90 | 1.1 |
| 100 | 1.1 |
| 110 | 1 |
| 120 | 0.9 |
| 130 | 0.9 |
| 140 | 0.85 |
| 150 | 0.85 |
| 160 | 0.8 |
| 170 | 0.8 |
| 180 | 0.85 |
| 190 | 0.85 |
| 200 | 0.85 |
| 210 | 0.8 |
| 220 | 0.8 |
| 230 | 0.8 |
| 240 | 0.8 |
| 270 | 0.85 |
| 300 | 0.8 |
| 330 | 0.76 |
| 360 | 0.76 |
| 390 | 0.78 |
| 420 | 0.8 |
| 450 | 0.8 |

TABLE XXII

| | |
|---|---|
| Equipment | Pump + Plexiglas cylindrical chamber<br>Pressure pirani gage #2<br>Microwave + Water filter as cold trap<br>Small asphalt puck |
| Conditions of experiment | Pumping by the top<br>Pressure measurement by the top |
| Schematic drawing: | FIG. 8 |

| Pressure Measurement | |
|---|---|
| t (s) | P1 chambre (torr) ↘ |
| 0 | 800 |
| 5 | 100 |
| 10 | 13 |

TABLE XXII-continued

| | |
|---|---|
| 20 | 7 |
| 30 | 6.2 |
| 40 | 6 |
| 50 | 5.8 |
| 60 | 5.8 |
| 70 | 5.8 |
| 80 | 5.8 |
| 90 | 5.8 |
| 100 | 5.8 |
| 110 | 5.8 |
| 120 | 5.8 |
| 130 | 5.8 |
| 140 | 5.6 |
| 150 | 5.6 |
| 160 | 5.6 |
| 170 | 5.6 |
| 180 | 5.6 |
| 190 | 5.6 |
| 200 | 5.6 |
| 210 | 5.4 |
| 220 | 5.4 |
| 230 | 5.4 |
| 240 | 5 |
| 270 | 4.8 |
| Minitial (g) | 1099.3 |
| Mfinal (g) | 1095.6 |
| % loss | 0.34% |

TABLE XXIII

| | |
|---|---|
| Equipment used | Pump + Plexiglas cylindrical chamber<br>Pressure pirani gage #2<br>Microwave + Water filter as cold trap<br>Small asphalt puck |
| Conditions of experiment | Pumping by the top<br>Pressure measurement by the top |
| Schematic drawing: | FIG. 8 |

| Pressure Measurement | |
|---|---|
| t (s) | P1 chambre (torr) ↘ |
| 0 | 800 |
| 5 | 100 |
| 10 | 10 |
| 20 | 6.2 |
| 30 | 5.8 |
| 40 | 5.6 |
| 50 | 5.6 |
| 60 | 5.6 |
| 70 | 5.6 |
| 80 | 5.4 |
| 90 | 5.4 |
| 100 | 5.4 |
| 110 | 5.4 |
| 120 | 5.4 |
| 130 | 5.4 |
| 140 | 5.4 |
| 150 | 5.2 |
| 160 | 5.2 |
| 170 | 5.2 |
| 180 | 5.2 |
| 190 | 5.2 |
| 200 | 5.2 |
| 210 | 5 |
| 220 | 5 |
| 230 | 5 |
| 240 | 4.8 |
| 270 | 4.6 |
| 300 | 4.4 |
| 330 | 4.2 |

TABLE XXIII-continued

| | |
|---|---|
| 360 | 4 |
| 390 | 4 |
| 420 | 4 |
| Minitial (g) | 1100 |
| Mfinal (g) | 1095.6 |
| % loss | 0.40% |

TABLE XXIV

| | |
|---|---|
| Equipment used | Pump + Plexiglas cylindrical chamber<br>Pressure pirani gage #2<br>Microwave + Water filter as cold trap<br>Small concrete puck |
| Conditions of experiment | Pumping by the top<br>Pressure measurement by the top |
| Schematic drawing: | FIG. 8 |

| Pressure Measurement | |
|---|---|
| t (s) | P1 chambre (torr) ↘ |
| 0 | 800 |
| 5 | 100 |
| 10 | 18 |
| 20 | 7.5 |
| 30 | 5.6 |
| 40 | 5.4 |
| 50 | 5.4 |
| 60 | 5.2 |
| 70 | 5.2 |
| 80 | 5.2 |
| 90 | 5.2 |
| 100 | 5.2 |
| 110 | 5.2 |
| 120 | 5.2 |
| 130 | 5.2 |
| 140 | 5.2 |
| 150 | 5.2 |
| 160 | 5.2 |
| 170 | 5.2 |
| 180 | 5.2 |
| 190 | 5.2 |
| 200 | 5.2 |
| 210 | 5.4 |
| 220 | 5.4 |
| 230 | 5.4 |
| 240 | 5.4 |
| 270 | 5.4 |
| 300 | 5.4 |
| 330 | 5.4 |
| 360 | 5.6 |
| 390 | 5.6 |
| 420 | 5.6 |
| Minitial (g) | 988.8 |
| Mfinal (g) | 982.4 |
| % loss | 0.65% |

TABLE XXV

| | |
|---|---|
| Equipment used | Pump + Plexiglas cylindrical chamber<br>Pressure pirani gage #2<br>Microwave + Water filter as cold trap<br>Small asphalt puck |
| Schematic drawing: | FIG. 8 |

| Pressure Measurement | |
|---|---|
| t (s) | P1 chambre (torr) ↘ |
| 10 | 11 |
| 20 | 5.4 |
| 30 | 3.9 |
| 40 | 3.6 |
| 50 | 3.4 |
| 60 | 3 |

TABLE XXV-continued

| | |
|---|---|
| 70 | 3.2 |
| 80 | 3.3 |
| 90 | 3.4 |
| 100 | 3.5 |
| 110 | 3.7 |
| 120 | 3.8 |
| 130 | 3.9 |
| 140 | 3.9 |
| 150 | 4 |
| 160 | 4 |
| 170 | 4.6 |
| 180 | 4.6 |
| 190 | 4.6 |
| 200 | 4.8 |
| 210 | 4.8 |
| 220 | 4.8 |
| 230 | 4.8 |
| 240 | 4.8 |
| 270 | 5.2 |
| 300 | 5.2 |
| 330 | 5.2 |
| 360 | 5.4 |
| 390 | 5.4 |
| 420 | 5.4 |
| 450 | 5.6 |
| 480 | 5.6 |
| 510 | 5.6 |
| 540 | 5.6 |
| 570 | 5.6 |
| 600 | 5.6 |
| Minitial (g) | 1101.4 |
| Mfinal (g) | 1095.4 |
| % loss | 0.54% |

| Conditions of experiment |
|---|
| Pumping by the top<br>Pressure measurement by the top |

TABLE XXVI

| | |
|---|---|
| Equipment used | Pump + Plexiglas cylindrical chamber<br>Pressure pirani gage #2<br>Microwave + Water filter as cold trap<br>Small asphalt puck |
| Conditions of experiment | Pumping by the top<br>Pressure measurement by the top |
| Schematic drawing: | FIG. 8 |

Pressure Measurement

| t (s) | P1 chambre (torr) ↘ |
|---|---|
| 0 | 800 |
| 5 | 100 |
| 10 | 76 |
| 20 | 8 |
| 30 | 5.8 |
| 40 | 5.6 |
| 50 | 5.6 |
| 60 | 5.6 |
| 70 | 5.6 |
| 80 | 5.6 |
| 90 | 5.6 |
| 100 | 6 |
| 110 | 6 |
| 120 | 5.8 |
| 130 | 5.8 |
| 140 | 5.8 |
| 150 | 6 |
| 160 | 5.8 |
| 170 | 5.8 |

TABLE XXVI-continued

| | |
|---|---|
| 180 | 6 |
| 190 | 6 |
| 200 | 6 |
| 210 | 6 |
| 220 | 5.8 |
| 230 | 6 |
| 240 | 6 |
| 270 | 5.8 |
| 300 | 5.4 |
| 330 | 5.8 |
| 360 | 5 |
| 390 | 4.8 |
| 420 | 4.2 |
| 450 | 4.4 |

TABLE XXVII

| | |
|---|---|
| Equipment used | Pump + Plexiglas cylindrical chamber<br>Pressure pirani gage #2<br>Microwave + Water filter as cold trap<br>Small asphalt puck |
| Conditions of experiment | Pumping by the top<br>Pressure measurement by the top |
| Schematic drawing: | FIG. 8 |

Pressure Measurement

| t (s) | P1 chambre (torr) ↘ |
|---|---|
| 0 | 800 |
| 5 | 100 |
| 10 | 10 |
| 20 | 9 |
| 30 | 5.8 |
| 40 | 5.4 |
| 50 | 5.4 |
| 60 | 5.2 |
| 70 | 5.2 |
| 80 | 5.4 |
| 90 | 5.4 |
| 100 | 5.4 |
| 110 | 5.2 |
| 120 | 5.2 |
| 130 | 5.2 |
| 140 | 5.2 |
| 150 | 5.2 |
| 160 | 5 |
| 170 | 4.8 |
| 180 | 4.8 |
| 190 | 4.8 |
| 200 | 4.8 |
| 210 | 4.6 |
| 220 | 4.2 |
| 230 | 4.2 |
| 240 | 4.2 |
| 270 | 4 |
| 300 | 3.6 |
| 330 | 3.3 |
| 360 | 3.2 |
| 390 | 2.8 |
| 420 | 2.6 |

TABLE XXVIII

| Pump<br>Plexiglas cylindrical chamber<br>Pressure pirani gage #2<br>Microwave<br>Water filter as cold trap | FIG. 8 System | |
|---|---|---|
| M(g) | Mwet | Mdry |
| Small Asphalt Puck, Fine aggregate | | |
| 1096.8 | 1104.1 | 1097.6 |
| Final Temperature (° C.) | | Initial Temperature (g) |
| 27-28° C. | | 7.3 |
| Initial Temperature (° C.) | | Final water content (g) |
| 23° C. | | 0.8 |
| Small Asphalt Puck, Coarse aggregate | | |
| 1389.0 | 1395.1 | 1388.8 |
| Final Temperature (° C.) | | Initial water content (g) |
| 35-37° C. | | 6.1 |
| Initial Temperature (° C.) | | Final water content (g) |
| 23° C. | | 0.2 |
| Big Asphalt Puck 1 | | |
| 4817.0 | 4822.0 | 4817.5 |
| Final Temperature (° C.) | | Initial water content (g) |
| 45-50° C. | | 5 |
| Initial Temperature (° C.) | | Final water content (g) |
| 23° C. | | 0.5 |
| Big Asphalt Puck 2 | | |
| 4736.9 | 4773.9 | 4743.6 |
| Final Temperature (° C.) | | Initial water content (g) |
| 30-32° C. | | 37 |
| Initial Temperature (° C.) | | Final water content (g) |
| 23° C. | | 6.7 |

Protocol of Experimentation:

In the one or more experiments that follow, testing for a puck was performed. In the experiment, air (ambient) was vacuumed out of the chamber of FIG. 8 until between 7 and 11 Torr was reached during the first two minutes. Vacuum was then applied until a pressure of about 20 Torr was reached for one minute while heating with microwave. The microwave was then turned off, and vacuum forces were applied for one minute. This cycle was repeated until the total cycle time was eight (8) minutes. The experimental setup

TABLE XXIX

Pump
Plexiglas cylindrical chamber
Pressure pirani gage #2
Microwave
Water filter as cold trap

FIG. 8 System

| Puck | Test | M(g) | Mwet (g) | Mdry (g) | Temperature (° C.) | Initial Water content (g) | Final Water content (g) |
|---|---|---|---|---|---|---|---|
| Small. | 1 | 1095.4 | 1098.7 | 1095.7 | 34-36 | 3.3 | 0.3 |
| made of | 2 | 1095.4 | 1099.1 | 1095.7 | 30-31 | 3.7 | 0.3 |
| 'Fine' | 3 | 1095.4 | 1099.6 | 1095.6 | 39-40 | 4.2 | 0.2 |
| Aggregates | 4 | 1095.4 | 1099.8 | 1095.6 | 38-40 | 4.4 | 0.2 |
| Small. | 1 | 1389 | 1394.6 | 1389.2 | 27-29 | 5.6 | 0.2 |
| made of | 2 | 1389 | 1394.1 | 1389.1 | 36-38 | 5.1 | 0.1 |
| 'Coarse' | 3 | 1389 | 1394 | 1389 | 26-29 | 5 | 0 |
| Aggregates | 4 | 1389 | 1395.3 | 1389 | 33-35 | 6.3 | 0 |
| Big. | 1 | 4817.4 | 4821 | 4817.4 | 28-30 | 3.6 | 0 |
| made of | 2 | 4817.4 | 4821.3 | 4817.4 | 33-35 | 3.9 | 0 |
| 'Fine' | 3 | 4817.4 | 4821.3 | 4817.2 | 38-40 | 3.9 | −0.2 |
| Aggregate | 4 | 4817.4 | 4821.4 | 4817.3 | 35-37 | 4 | −0.1 |
| Big. | 1 | 4737.2 | 4764.5 | 4737.2 | 34-35 | 27.3 | 0 |
| made of | 2 | 4737.2 | 4765.1 | 4737.9 | 34-37 | 27.9 | 0.7 |
| 'Coarse' | 3 | 4737.2 | 4771.2 | 4738.3 | 28-30 | 34 | 1.1 |
| Aggregate | | | | | | | |

TABLE XXX

| Pump<br>Rice Test chamber<br>Pressure pirani gage #2<br>Microwave<br>Water filter as cold trap | FIG. 6 System<br>Cycle of Pressure application (vacuum), then microwave for one minute each for an eight minute cycle | | | | | |
|---|---|---|---|---|---|---|
| Puck | Test | Initial mass (g) | Initial Absorption | Final mass (g) | Water content | Final Absorption [Mwet-Mdry]/Mdry |
| SAND | 1 | 250.2 | 8% | 241.6 | 8.6 | 3.44% |
| | 2 | | | 239.1 | 11.1 | 4.44% |
| | 3 | | | 236.3 | 13.9 | 5.55% |
| | 4 | | | 232.2 | 18 | 7.19% |
| | 5 | | | | | 7.51% |
| | 6 | | | | | 7.59% |
| | 7 | | | | | 7.59% |
| FRANKEN | 1 | 283.1 | 8% | 271.7 | 11.7 | 4.1% |
| SOIL | 2 | | | 264.8 | 18.5 | 6.53% |
| | 3 | | | 261.7 | 21.6 | 7.63% |
| | 4 | | | 261.7 | 21.6 | 7.63% |

TABLE XXXI

| Pump<br>Rice Test chamber<br>Pressure pirani gage #2<br>Microwave<br>Water filter as cold trap | | | | FIG. 6 System<br>Cycle of Pressure application (vacuum), then microwave for one minute each for an eight minute cycle | | | |
|---|---|---|---|---|---|---|---|
| Puck | M(g) | Mwet (g) | Mdry (g) | Temperature (° C.) Initial/ | Final | Initial Water content (g) | Final Water content (g) |
| Small. 'Fine' Aggregates | 1095.2 | 1100.3 | 1095.7 | 21 | 35-40 | 5.1 | 0.5 |
| Small. 'Coarse' Aggregates | 1389.1 | 1394.5 | 1389.3 | 21 | 32-35 | 5.4 | 0.2 |
| Big. 'Fine' Aggregate | 4817.3 | 4821.6 | 4817.6 | 20 | 34-36 | 4.3 | 0.3 |
| Big. 'Coarse' Aggregate | 4735.9 | 4775.9 | 4756.4 | 20 | 35-37 | 40 | 20.5 |

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for drying at least one sample of material using a small portable field device, the method comprising:

placing a sample of a road construction related material into an interior of a chamber;

placing the chamber with the sample therein into a heating device;

applying a vacuum to regulate pressure of the interior of the chamber, wherein the vacuum provides pumping forces to the chamber, thereby applying a pressure that induces fluid flow therein to the sample;

applying heating to the sample using the heating device to regulate a temperature of the sample at a substantially constant regulated temperature while applying the vacuum to the interior of the chamber; and determining that the sample is dry based on the at least one monitored condition.

2. The method of claim 1, wherein the sample has a mass less than 4.5 kg.

3. The method of claim 1, wherein the heating device comprises a quick-release vacuum hookup, and wherein the method comprises coupling the chamber to the hookup before applying the vacuum.

4. The method of claim 1, wherein the heating device comprises multiple quick-release vacuum hookups, and the method comprises:

placing multiple samples of a road construction related material into the respective interiors of multiple chambers;

placing the chambers with the samples therein into a heating device;

applying respective vacuums to regulate the respective pressures of the interiors of the chambers.

5. The method of claim 1, wherein applying heating to the sample using the heating device comprises applying microwave energy to the sample.

6. The method of claim 1, wherein the regulated temperature is above or about room temperature.

7. The method of claim 1, further comprising filtering moisture from air evacuated from the chamber during at least a portion of the applying the vacuum.

8. The method of claim 1, wherein the at least one sample of material is at least one compacted asphalt sample, loose asphalt mix, and loose aggregate.

9. The method of claim 1, wherein the vacuum is applied by a vacuum pump, and wherein the temperature of the sample and the pressure of the interior of the chamber are regulated in concert to maximize mass transfer with the vacuum pump.

10. The method of claim 1, wherein monitoring the at least one condition comprises monitoring pressure of the sealed chamber.

11. The method of claim 1, wherein the monitoring the at least one condition comprises monitoring infrared radiation.

12. A field portable system for drying a sample of material, the system comprising:

a sealable chamber including an interior sized and configured to house the sample of material, wherein the sample is a construction material from a road surface or material for use as a road surface, the chamber including an outlet;

a vacuum pump in fluid communication with the chamber to evacuate air from the interior of the chamber through the outlet of the chamber thereby regulating a pressure of the interior of the chamber, wherein the vacuum provides pumping forces to the chamber, thereby applying a pressure that induces fluid flow therein to the sample;

an electromagnetic wave source in communication with the chamber; and at least one controller configured to:

operate the vacuum pump and the electromagnetic wave source;

start and stop a drying operation using the vacuum pump and the electromagnetic wave source;

monitor pressure and infrared radiation in the interior of the chamber; and determine that the at least one sample of material is dry based on the monitored pressure and infrared radiation, wherein heating is carried out by automatically adjusting the energy of the electromagnetic wave source to regulate a temperature of the at least one sample in concert with regulating the pressure of the interior of the chamber.

13. The field portable system of claim 12, further comprising a first valve positioned between the vacuum pump and the chamber and a second valve in fluid communication with the chamber and configured to introduce atmospheric air to the interior of the chamber when open, wherein the controller is configured to open and close the first and second valves.

14. The field portable system of claim 13, wherein, during the drying operation: the vacuum pump is on; the first valve is open; the second valve is closed; and the electromagnetic wave source is operated to maintain the interior of the chamber at about room temperature.

15. The field portable system of claim 14, further comprising a lid for sealably closing the chamber during the drying operation, wherein the first valve is closed and the second valve is open after the drying operation to allow the lid to be removed and the at least one dry sample to be accessed.

16. The field portable system of claim 12, further comprising a moisture trap positioned between the vacuum pump and the chamber to filter moisture from the evacuated air during the drying operation.

17. The field portable system of claim 12, further comprising at least one evaporator plate positioned below the sample and configured to provide thermal energy to evaporate residual water within the chamber during the drying operation.

18. The field portable system of claim 12, further comprising a pressure sensor configured to detect the pressure inside the chamber and an infrared radiation sensor configured to detect the infrared radiation inside the chamber.

19. The field portable system of claim 12, wherein the temperature of the sample and the pressure of the interior of the chamber are regulated in concert to maximize mass transfer with the vacuum pump.

20. The field portable system of claim 12, wherein the interior of the sealable chamber is sized and configured to house a sample having a mass less than 4.5 kg.

* * * * *